US012675920B2

(12) United States Patent
Lanfer et al.

(10) Patent No.: US 12,675,920 B2
(45) Date of Patent: Jul. 7, 2026

(54) METHOD AND SYSTEM FOR DESIGNING THE APPEARANCE OF OBJECTS BEING COATED WITH A LEAST ONE COLORED COATING LAYER

(71) Applicant: BASF COATINGS GMBH, Muenster (DE)

(72) Inventors: Benjamin Lanfer, Muenster (DE); Jens Wegner, Muenster (DE); Mark Gutjahr, Muenster (DE); Florina Trost, Muenster (DE); Michaela Finkenzeller, Muenster (DE); Andreas Pflug, Ludwigshafen (DE); Julius Steinhauser, Berlin (DE); Matthias Winckelmann, Berlin (DE); Henrik Mauler, Berlin (DE); Helge Kiehl, Berlin (DE)

(73) Assignee: BASF COATINGS GMBH, Muenster (DE)

( * ) Notice: Subject to any disclaimer, the term of this patent is extended or adjusted under 35 U.S.C. 154(b) by 272 days.

(21) Appl. No.: 18/558,493

(22) PCT Filed: Apr. 21, 2022

(86) PCT No.: PCT/EP2022/060509
§ 371 (c)(1),
(2) Date: Nov. 1, 2023

(87) PCT Pub. No.: WO2022/233580
PCT Pub. Date: Nov. 10, 2022

(65) Prior Publication Data
US 2024/0233210 A1      Jul. 11, 2024

(30) Foreign Application Priority Data

May 3, 2021    (EP) ..................................... 21171789

(51) Int. Cl.
G06T 11/10          (2026.01)
G06T 7/00          (2017.01)
G06T 11/60          (2026.01)

(52) U.S. Cl.
CPC ............ G06T 11/10 (2026.01); G06T 7/0004 (2013.01); G06T 11/60 (2013.01); *G06T 2200/24* (2013.01); *G06T 2207/30156* (2013.01)

(58) Field of Classification Search
CPC ......... G06T 11/001; G06T 7/00; G06T 11/60; G06T 2200/24; G06T 2207/30156
See application file for complete search history.

(56) References Cited

U.S. PATENT DOCUMENTS

2005/0128484 A1    6/2005  Rodrigues et al.
2013/0257888 A1*  10/2013  Behrens ................... G09G 5/02
                                                                     345/589

(Continued)

FOREIGN PATENT DOCUMENTS

JP          H10323612 A      12/1998
JP          200577202 A      3/2005

OTHER PUBLICATIONS

International Search Report and Written Opinion for corresponding PCT/EP22/60509, mailed Jul. 22, 2022, 11 pages.

(Continued)

*Primary Examiner* — Kee M Tung
*Assistant Examiner* — Khoa Vu
(74) *Attorney, Agent, or Firm* — Armstrong Teasdale LLP

(57)          ABSTRACT

Disclosed herein are methods and systems for designing the appearance of an object coated with at least one colored coating layer. More specifically, methods and systems are disclosed for designing the appearance of a coated object using a display device by modifying the displayed formu-
(Continued)

lation of the coating material used to prepare the colored coating layer via an interaction element and using said modified formulation to generate and display the corresponding modified color of the coating layer.

15 Claims, 7 Drawing Sheets

(56) References Cited

U.S. PATENT DOCUMENTS

| | | | |
|---|---|---|---|
| 2016/0275326 A1* | 9/2016 | Falkenstern | ......... G07D 7/0034 |
| 2024/0013557 A1* | 1/2024 | Groves | ................. G06T 11/001 |

OTHER PUBLICATIONS

Erell Oded, "Freebie: Advanced car paint OSL Shader—CG Lion Studio," Jul. 23, 2020, https://web.archive.org/web/20210126123821/ https://cg-lion.com/2020/07/25/freebie-advanced-car-paint-osl-shader/, retrieved on Oct. 13, 2021, 8 pages.
CG Lion Studio, "CGL Car Paint Presents Pack 1.0," Aug. 2018, https://www.youtube.com/watch?v=Li5n52R9FEQ, retrieved on Oct. 14, 2021, 4 pages.

* cited by examiner

METHOD AND SYSTEM FOR DESIGNING THE APPEARANCE OF OBJECTS BEING COATED WITH A LEAST ONE COLORED COATING LAYER

CROSS-REFERENCE TO RELATED APPLICATIONS

This application is a U.S. National Phase Application of International Patent Application No. PCT/EP22/60509, filed Apr. 21, 2022, which claims priority to European Patent Application No. 21171789.7, filed May 3, 2021, each of which is hereby incorporated by reference herein.

FIELD

Aspects described herein generally relate to methods and systems for designing the appearance of an object being coated with at least one colored coating layer. More specifically, aspects described herein relate methods and systems for designing the appearance of a coated object using a display device by modifying the displayed formulation of the coating material used to prepare the colored coating layer via an interaction element and using said modified formulation to generate and display the corresponding modified color of the coating layer.

BACKGROUND

Vehicles, in particular land vehicles such as automobile, motorcycle and truck bodies, are normally treated with multiple layers of coatings which enhance the appearance of the vehicle and also provide protection from corrosion, scratch, chipping, ultraviolet light, acid rain and other environmental conditions.

Said coatings are typically composite coating systems requiring the application of a multiple coating layers to achieve the aforementioned effects. In case of metallic substrates, an electrocoat is typically applied on the substrate and cured. This electrocoat is then coated with a cured primer coating or an uncured colored first basecoat before a further colored basecoat and a clearcoat or tinted clearcoat is applied over the noncured or "wet" first and/or further colored basecoat. In case of plastic substrates, a primer coating is applied on the substrate and cured before at least one further colored basecoat coating and a clearcoat or untinted clearcoat is applied over the noncured or "wet" colored basecoat coating(s). The applied basecoat and clearcoat coating(s) are then jointly cured. Thus, such systems are often described as "wet on wet", "two-coat/one bake" or "three-coat/one bake". Drying processes that fall short of complete cure may be used between the application of the coatings. The visual appearance in terms of color is normally achieved by the colored basecoat coating comprising colored and/or effect pigments.

The design process of the color of such basecoat layers typically occurs in a multi-step process involving numerous people. In a first step, the automotive color designer describes to an automotive paint manufacturer the color desired for a particular automotive and asks the automotive paint manufacturer to develop the color accordingly. For this purpose, the designer may use an existing color library, such as color chips or color databases, as a basis and may indicate to the automotive paint manufacturer the changes with respect to a color being present in the existing color library. The automotive paint manufacturer then designs a color in view of the description provided by the designer and provides the color to the designer, for example by preparing color chips comprising the cured colored coating layer or by providing high quality images of the designed color, normally prepared from colorimetrically measuring the color of the cured colored coating layer and converting the obtained color data to an image of the respective color. The designer then evaluates the color designed by the automotive paint manufacturer. Frequently, the designed color does not meet the color desired by the designer because the terms such as sparkle intensity, deepness, lightness, etc. (hereinafter these words are referred to as "impression terms") used by the designer may be interpreted differently by the automotive paint manufacturer due to the fact that the visual impression of a color varies depending on the individual. Therefore, the process of designing and evaluating must often be repeated many times over a period of weeks or even months until the desired color is obtained. This results in large amounts of time and money being spend on the design process for a single new color.

It would therefore be desirable to provide computer-based methods and systems which would allow the designer to design the desired color himself, thus avoiding the involvement of several people during the color design process such that the time and costs associated with such a process can be reduced.

Definitions

"Appearance" refers to the visual impression of the coated object to the eye of an observer and includes the perception in which the spectral and geometric aspects of a surface is integrated with its illuminating and viewing environment. In general, appearance includes color, visual texture such as coarseness caused by effect pigments, sparkle, or other visual effects of a surface, especially when viewed from varying viewing angles and/or with varying illumination angles.

"Digital representation" may refer to a representation of a colored coating layer in a computer readable form. In particular, the digital representation of the colored coating layer may, e.g. be data on the formulation of the coating material used to prepare the respective colored coating layer. Such data may comprise data on at least part of the ingredients being present in the coating material, for example types and amounts of ingredients.

"Display device" refers to an output device for presentation of information in visual or tactile form (the latter may be used in tactile electronic displays for blind people). "Screen of the display device" refers to physical screens of display devices and projection regions of projection display devices alike.

"Interaction element" may refer to an element configured to receive a user input.

"Communication interface" may refer to a software and/or hardware interface for establishing communication such as transfer or exchange or signals or data. Software interfaces may be e. g. function calls, APIs. Communication interfaces may comprise transceivers and/or receivers. The communication may either be wired, or it may be wireless. Communication interface may be based on or it supports one or more communication protocols. The communication protocol may a wireless protocol, for example: short distance communication protocol such as Bluetooth®, or WiFi, or long distance communication protocol such as cellular or mobile network, for example, second-generation cellular network ("2G"), 3G, 4G, Long-Term Evolution ("LTE"), or 5G. Alternatively, or in addition, the communication interface may even be based on a proprietary short distance or long distance protocol. The communication interface may support any one or more standards and/or proprietary protocols.

"Computer processor" refers to an arbitrary logic circuitry configured to perform basic operations of a computer or system, and/or, generally, to a device which is configured for performing calculations or logic operations. In particular, the processing means, or computer processor may be configured for processing basic instructions that drive the computer or system. As an example, the processing means or computer processor may comprise at least one arithmetic logic unit ("ALU"), at least one floating-point unit ("FPU)", such as a math coprocessor or a numeric coprocessor, a plurality of registers, specifically registers configured for supplying operands to the ALU and storing results of operations, and a memory, such as an L1 and L2 cache memory. In particular, the processing means, or computer processor may be a multicore processor. Specifically, the processing means, or computer processor may be or may comprise a Central Processing Unit ("CPU"). The processing means or computer processor may be a ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The processing means may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The methods, systems and devices described herein may be implemented as software in a DSP, in a micro-controller, or in any other side-processor or as hardware circuit within an ASIC, CPLD, or FPGA. It is to be understood that the term processing means or processor may also refer to one or more processing devices, such as a distributed system of processing devices located across multiple computer systems (e.g., cloud computing), and is not limited to a single device unless otherwise specified.

SUMMARY

To address the above-mentioned problems in a perspective the following is proposed: a method for designing the appearance of an object being coated with at least one colored coating layer, said method comprising the steps of:
- (i) providing to a computer processor via a communication interface a digital representation of a colored coating layer for display on a screen of a display device;
- (ii) detecting with the computer processor via an interaction element a user input;
- (iii) converting with the computer processor the detected user input into a modified digital representation of the colored coating layer;
- (iv) optionally repeating steps (i) to (iii);
- (v) generating with the computer processor color data of the coating layer(s) based on the modified digital representation(s) of the colored coating layer(s);
- (vi) displaying on the screen of the display device the generated color data received from the processor; and
- (vii) optionally repeating steps (i) to (vi) or steps (ii) to (vi) or steps (v) and (vi).

It is an essential advantage of the method according to the present invention that it allows the designer to develop the desired color by selecting an appropriate starting color and by manipulating the formulation of the coating material associated with the starting color. The modified formulation is used to calculate modified color data which is then converted to a modified color. The modified color is displayed and automatically updated during manipulation of the formulation, thus visualizing the effects of the manipulation. This allows the designer to obtain the desired color by simply manipulating the formulation of the coating material. The modified formulation may be checked with regard to its suitability for production and stability by determining whether the modified formulation fulfills certain predefined tolerances. This ensures that the designed color can be produced by the automotive paint manufacturer and allows to provide guidance to the designer in case the desired color is unstable or unproducible.

Further disclosed is:

A system for designing the color of a colored coating layer being produced from a colored coating material. According to a first alternative, said system comprises:
- a communication interface for providing a digital representation of a colored coating layer to a processor;
- a display device comprising a screen;
- an interaction element for detecting a user input;
- a processor in communication with the communication interface, the interaction element and the display device, the processor programmed to:
  - receive via the communication interface the digital representation of a colored coating layer;
  - detect a user input via the interaction element;
  - convert the detected user input into a modified digital representation of the colored coating layer;
  - generate color data of the coating layer based on the modified digital representation of the colored coating layer, wherein the display device receives the provided digital representation and the generated color data of the colored coating layer from the processor and displays the digital representation and the color of the coating layer.

According to a second alternative, said system comprises:
- a communication interface for providing a digital representation of a colored coating layer for display on the screen;
- a display device comprising a screen;
- an interaction element for detecting a user input;
- a first processor in communication with the communication interface, the interaction element and the display device, the processor programmed to:
  - receive via the communication interface the digital representation of a colored coating layer;
  - detect a user input via the interaction element; and
  - optionally convert the detected user input into a modified digital representation of the colored coating layer,
- a second processor in communication with the first processor, the second processor programmed to:
  - optionally convert the detected user input into a modified digital representation of the colored coating layer; and
  - generate color data of the coating layer based on the modified digital representation of the colored coating layer,
- wherein the display device receives the provided digital representation from the first processor and the generated color data of the colored coating layer form the second processor and displays the digital representation and the color of the coating layer.

Further disclosed is:

A non-transitory computer-readable storage medium, the computer-readable storage medium including instructions that when executed by a computer, cause the computer to perform the steps according to the computer-implemented method described herein.

The disclosure applies to the systems, methods, computer programs, computer readable non-transitory media, computer program products disclosed herein alike. Therefore, no differentiation is made between systems, methods, computer programs, computer readable non-volatile storage media or computer program products. All features are disclosed in connection with the systems, methods, computer programs, computer readable non-transitory storage media, and computer program products disclosed herein.

Further disclosed is a system comprising an object having at least one surface and at least one colored coating layer being present on at least part of the surface of the object, wherein the color of at least one colored coating layer was designed according to the method disclosed herein. The object may be any real object and is in particular an automotive or a part thereof.

Further disclosed is the use of the method disclosed herein for designing the color of at least one colored coating layer being present on at least part of the surface of an object.

Further disclosed is an object being coated with at least one coating layer, wherein the color of at least one coating layer was designed according to the method disclosed herein.

Embodiments of the Inventive Method

The inventive method allows to design the appearance of an object being coated with at least one colored coating layer. The at least one colored coating layer may be present on at least part of the surface of the object. The presence of the colored coating layer on at least part of the surface of the object is understood as follows: the colored coating layer is arranged on at least part of the surface of the object. However, a direct contact with at least part of the surface of the object is not necessary. Thus, other coating layers, such as cured electrocoats or primer layers as previously described can be present between the colored coating layer and the object.

The at least one colored coating layer may be a basecoat layer or a tinted clearcoat layer. "Basecoat layer" may refer to a cured color-imparting intermediate coating layer commonly used in automotive painting and general industrial painting. The basecoat material used to prepare the basecoat layer may be formulated as a solid color (straight shade) or effect color coating. "Effect color coatings" generally contain at least one effect pigment and optionally other colored pigments or spheres which give the desired color and effect. "Straight shade" or "solid color coatings" primarily contain colored pigments and exhibit no visible flop or two-tone metallic effect. The basecoat layer is formed by applying the basecoat material to a metal or plastic substrate optionally comprising at least one cured coating layer, drying the applied basecoat material, and curing the formed basecoat film. "Tinted clearcoat layer" may refer to a cured coating layer which is neither completely transparent and colorless as a clear coating nor completely opaque as a typical pigmented basecoat. A tinted clearcoat layer is therefore transparent and colored or semi-transparent and colored. The color can be achieved by adding small amounts of pigments commonly used in basecoat coating materials. The tined clearcoat layer is formed by applying the tinted clearcoat material to a substrate commonly comprising at least one coating layer, such as a colored basecoat layer, drying the applied tinted clearcoat material and curing the formed tinted clearcoat film.

The object may be an automotive or a part thereof. The term "automotive" refers to an automobile such as a car, a van, a minivan, a bus, a SUV (sports utility vehicle); a truck; a semitruck; a tractor; a motorcycle; a trailer; an ATV (all-terrain vehicle); a pickup truck; a heavy duty mover, such as bulldozer, mobile crane and earth mover; an airplanes; boats; ships; and other modes of transport that are commonly coated with at least one coating layer.

In an aspect, the display device comprises an enclosure housing the computer processor and the screen. The display device therefore comprises the computer processor and the screen. The enclosure may be made of plastic, metal, glass, or a combination thereof.

In an alternative aspect, the display device and the computer processor performing steps (i), (ii), (iii) and (v) or steps (iii) and (v) or step (v) are configured as separate components. According to this aspect, the display device comprises an enclosure housing the screen but not the computer processor performing steps (i), (ii), (iii) and (v) or the steps (iii) and (v) or step (v) of the inventive method. The computer processor performing steps (i), (ii), (iii) and (v) or the steps (iii) and (v) or step (v) of the inventive method is thus present separately from the display device, for example in a further computing device. The computer processor of the display device and the further computer processor are connected via a communication interface to allow data exchange. Use of a further computer processor being present outside of the display device allows to use higher computing power than provided by the processor of the display device, thus reducing the computing time necessary to perform these steps and thus the overall time until the modified color of the coating layer is displayed on the screen of the display device. This allows real-time modification of the provided digital representation of the colored coating layer resulting in that the user immediately sees the effects of the modification of the formulation of the coating material on the color of the colored coating layer. Thus, the user can easily understand the effects of the modification of the coating material on the color of the coating layer. The design process can therefore be performed within a short time and allows to obtain the desired color precisely. The further computer processor can be located on a server, such that steps (i), (ii), (iii) and (v) or the steps (iii) and (v) or step (v) of the inventive method are performed in a cloud computing environment. In this case, the display device functions as client device and is connected to the server via a network, such as the Internet. "Client device" may refer to a computer or a program that, as part of its operation, relies on sending a request to another program or a computer hardware or software that accesses a service made available by a server. Preferably, the server may be an HTTP server and is accessed via conventional Internet web-based technology. The internet-based system is in particular useful, if the service of designing the color of a colored coating layer being produced from a colored coating material is provided to customers or in a larger company setup.

In yet another aspect, the display device is a projection display device configured to project, e.g. display, the digital representation and/or the generated color data on a projection region. In this case, the projection region is corresponding to the screen of the display device as previously outlined. The projection surface used for projection of the digital representation and/or generated color data may be a 2D or a 3D surface, such as a flat wall or desk, an automotive or a part thereof or a defined 3D space. In one example, the generated color data may be projected onto a 3D surface in the form of an automotive or part thereof. The 3D surface may be colored, semi-transparent or transparent. In another example, the generated color data may be displayed by the projection device using 3D hologram techniques in which the colored 3D object, such as an automotive or a part thereof being obtained by rendering processes described below is projected freely in a predefined space and can be viewed without 3D glasses etc. Use of a projection surface corresponding to the shape of the object for which the new color is to be designed or use of a colored hologram allows to enhance the visualization of the generated color because the user can directly compare the appearance of the colored object with the desired visual appearance of the object. The user input on the projection surface may be detected with the projection display device via an image detection system. Suitable projection display devices used to project images and/or to project images and to detect interaction of a user with these images, are well known in the state of the art.

In yet a further aspect, the display device comprising an enclosure housing the screen and a projection display device as previously described may be used in combination. In one example, the display device comprising an enclosure housing the screen may be used for steps (i) and (ii), while the projection display device may be used to display the generated color data in step (vi). In another example, the projection display device may be used for steps (i) and (ii) while the display device comprising an enclosure housing the screen may be used to display the generated color data in step (vi).

In an aspect, steps (ii) to (vi) are performed simultaneously. "Simultaneously" refers to the time it takes the computer processor to perform each of steps (ii) to (v) and the display device to display the generated color data. Preferably, the time is small enough such that the user can instantly see the effect of the color modification within a reasonable time, such as up to a couple of seconds, in particular up to a second, thus allowing to perform color modification interactively and resulting in a fast and precise design process.

In step (i) of the inventive method, a digital representation of a colored coating layer for display on a screen of a display device is provided to a computer processor via a communication interface. The communication interface may be wired or wireless, in particular wireless. Examples of wireless communication interfaces are WLAN, WiFi or Bluetooth.

The computer processor may be any suitable kind of processor. According to various embodiments, the computer processor, in particular the processor of the display device, may comprise a graphics processing unit (GPU) specifically designed to handle graphics processing. For example, suitable GPU's are available from NVIDIA and AMD (Advanced Micro Devices, Inc.). The processor may also be in communication with a memory and interaction elements, such as input/output devices. The input/output devices may allow the user to configure the device and/or to input data. In various embodiments, the display device may provide a menu-driven user interface on the screen or on a secondary display allowing the user to enter information and to guide the user through the design process. In addition to other peripherals, the processor may be in communication with a computer via wired or wireless data link, such as, for example, a RS232 or Universal Serial Bus (USB) link.

In an aspect, the digital representation of the colored coating layer comprises data on the formulation of a coating material used to prepare the colored coating layer and optionally color data of the colored coating layer. Data on the formulation of the coating material used to prepare the colored coating layer may comprise data on the type and amount of at least part of the ingredients being present in the coating material. Colored coating materials typically comprise at least one pigment, at least one binder and at least one solvent. Further ingredients are, for example, fillers, matting agents, crosslinking agents and additives. "Color data" may refer to color space data, gloss data, appearance data, bi-direction reflectance distribution function (BRDF), bidirectional texture functions (BTFs) or combinations thereof. One example of color space data are defined by $L^*a^*b^*$, where $L^*$ represents luminous intensity, $a^*$ represents a red/green appearance, $b^*$ represents a yellow/blue appearance. Another example of color space data is defined by $L^*$, $C^*$, h, where $L^*$ represents lightness, $C^*$ represents chroma, and h represents hue. The bidirectional texture function (BTF) is a 6-dimensional function depending on planar texture coordinates (x,y) as well as on view and illumination spherical angles, thus the BTF is a representation of the appearance of texture as a function of viewing and illumination direction, i.e. viewing and illumination angle. It is an image-based representation since the geometry of the surface of the object to be considered is unknown and not measured. The BTF is typically captured by imaging the surface at a sampling of the hemisphere of possible viewing and illumination directions, such that BTF measurements are typically collections of images (see Dana, Kristin J. et al., "Reflectance and Texture of Real-5 World Surfaces", ACM Transactions on Graphics, vol 18, 1999, pages 1 to 34). The color data preferably comprises a BTF, in particular an optimized BTF generated by the method outlined below. The color data contained in the provided digital representation can be used to display the color associated with the formulation of the coating material as described later on and allows the user to check whether the correct digital representation of the colored coating layer has been provided to the computer processor in step (i).

In an aspect, providing the digital representation of the colored coating layer comprises providing coating layer identification data, obtaining the digital representation of the coating layer based on the provided coating layer identification data and providing the obtained digital representation. In one example, providing coating layer identification data includes providing color data of the coating layer. In another example, providing coating layer identification data includes providing data being indicative of the colored coating layer. Data being indicative of the colored coating layer may refer to the color number, the color name, a QR code, a bar code, etc. The coating layer identification data may be provided by the user via the screen of the display device. The screen may comprise a GUI in order to facilitate the data entry for the user. The digital representation of the coating layer may then be obtained by searching a database for said digital representation based on the provided coating layer identification data.

In an alternative aspect, providing the digital representation of the colored coating layer comprises displaying a pre-existing color library on the screen of the display device, selecting a color from the displayed pre-existing library, obtaining the digital representation of the colored coating layer based on the selected color and providing the obtained digital representation of the colored coating layer. The term "pre-existing color library" refers to a database with a set amount of preselected colors. The pre-existing color library may include at least 2 different colors, each color corresponding to the color of a colored coating layer being prepared from a coating material and each color being defined by colorimetrically measured color data or by calculated color data, in particular by calculated color data.

Colorimetrically measured color data can be obtained by recording the color data obtained from a measuring device upon measuring the color of the colored coating layer. "Calculated color data" may refer to color data obtained by calculation, for example by optimizing measured color data. In one example, calculated color data may comprise an optimized BTF (bi-directional texture function) which is obtained by the following steps:

determining an initial BTF for the object using a camera-based measurement device, capturing spectral reflectance data for the object for a pre-given number, i.e. a limited number of different measurement geometries using a spectrophotometer, and adapting the initial BTF to the captured spectral reflectance data to obtain an optimized BTF by segmenting the initial BTF of formula (1)

$$f(x, \bar{\imath}, \bar{o}) = \chi(\bar{\imath}, \bar{o})\left(\frac{a}{\pi} + \Sigma_{k=1}^{3} f_{S_k, a_k, F_{0,k}}^{CT}(\bar{\imath}, \bar{o})\right) + \Xi(x, \bar{\imath}, \bar{o}) \qquad (1)$$

in which x: surface coordinates of the sample/object $\bar{\imath}, \bar{o}$: illumination and observation/viewing directions at the basecoat of the sample $\chi(\bar{\imath}, \bar{o})$: color table depending on illumination and observation direction $\alpha$: Albedo or diffuse reflectivity $$f_{S_k, a_k, F_{0,k}}^{CT}(\bar{\imath}, \bar{o})$$

the k-th Cook-Torrance lobe; the Cook-Torrance lobe is a commonly used BRDF that describes the glossiness of a microfacet surface $S_k$: weight for the k-th Cook-Torrance lobe $\alpha_k$: parameter for the Beckmann distribution of the k-th Cook-Torrance lobe $F_{0,k}$: Fresnel reflectivity for the k-th Cook-Torrance lobe $\Xi(x, \bar{\imath}, \bar{o})$: table of spatial texture images depending on illumination and observation direction into a term $$\chi(\bar{\imath}, \bar{o})\left(\frac{a}{\pi} + \Sigma_{k=1}^{3} f_{S_k, a_k, F_{0,k}}^{CT}(\bar{\imath}, \bar{o})\right) \qquad (F1)$$

and a term $\Xi(x, \bar{\imath}, \bar{o})$ (F2), further dividing the first term (F1) into a first sub-term corresponding to a color table depending on illumination and observation direction $\chi(\bar{\imath}, \bar{o})$ and a second sub-term corresponding to an intensity function $$\left(\frac{a}{\pi} + \Sigma_{k=1}^{3} f_{S_k, a_k, F_{0,k}}^{CT}(\bar{\imath}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

In the first step, the camera-based measurement device creates a plurality of images (photos) of the sample at different viewing angles, at different illumination angles, at different illumination colors and/or for different exposure times, thus providing a plurality of measurement data considering a plurality of combinations of illumination angle, viewing angle, illumination color and/or exposure time. Suitable camera-based measurement devices are commercially available, such as, for example, the X-Rite TAC7® measurement device. As sample, a small flat panel coated with a cured colored coating layer or a cured multilayer coating comprising a colored coating layer coated with a clearcoat layer is used. The images obtained from the measurement device are post-processed to obtain the initial BTF. Post-processing may include creating images with high dynamic range from images being taken under a constant illumination and viewing angle but varying illumination color and exposure time, respectively. Post-processing may also include correcting the perspective of the photos relative to the sample and extraction of color and texture data from the photos. On the basis of the data gained by the post-processing, the parameters of the initial BTF are determined.

In the second step, spectral reflectance curves are acquired only for a limited number of measurement geometries. Each measurement geometry is defined by a specific illumination angle/direction and a specific viewing angle/direction. The spectral reflectance measurements are performed, for example, by a hand-held spectrophotometer, such as, for example, a Byk-Mac I® with six measurement geometries (i.e. a fixed illumination angle and viewing/measurement angles of −15°, 15°, 25°, 45°, 75°, 110°), an X-Rite MAT12 ® with twelve measurement geometries (two illumination angles and six measurement angles), or an X-Rite MA 98® (two illumination angles and up to eleven measurement angles). The spectral reflectance data obtained from these measurement devices is more accurate than the color information obtained from the camera-based measurement device used in the first step.

In the third step, the initial BTF is segmented (divided) into two main terms (F1) and (F2). The first term (F1) is a homogeneous bi-directional reflectance distribution function $$f \chi(\bar{\imath}, \bar{o})\left(\frac{a}{\pi} + \Sigma_{k=1}^{3} f_{S_k, a_k, F_{0,k}}^{CT}(\bar{\imath}, \bar{o})\right) (BRDF)$$

which describes reflectance properties of the sample depending only on the measurement geometry. This BRDF is a function of four real variables that defines how light is reflected at an opaque surface. The function takes an incoming light direction $\bar{\imath}$ and an outgoing direction $\bar{o}$ and returns the ratio of reflected radiance exiting along $\bar{o}$ to the irradiance incident on the surface from direction $\bar{\imath}$. Generally, the BRDF consists of three color coordinates as a function of scattering geometry, thus the specific illuminant and the color system (for example CIELAB) must be specified and included with any data when dealing with the BRDF. The BRDF is a collection of photometric data of any material (herein meaning the sample) that will describe photometric reflective light scattering characteristics of the material (the sample) as a function of illumination angle and reflective scattering angle. The BRDF describes the spectral and spatial reflective scattering properties of the material (the sample), particularly of a gonioapparent material comprised by the sample, and provides a description of the appearance of the material. Thus, many other appearance attributes, such as gloss, haze, and color, can be easily derived from the BRDF.

The second term (F2) is a texture function which accounts for a spatially varying appearance of the sample $\Xi(x, \bar{i}, \bar{o})$, i.e. which adds a view and illumination dependent texture image. When viewed from afar, the overall color impression of the sample is not determined by the color at a single point but by the average color of a larger area. The view and illumination dependent texture images have the property that the sum of the intensities in each of the RGB channels is zero when averaged across all pixels. Due to this property, it is assumed that the average color across a larger region of the texture image is zero or close to zero, allowing to overlay the texture image without changing the overall color and to ignore the texture images and thus term (F2) when optimizing the initial BTF. Therefore, only term (F1) is optimized when optimizing the initial BTF.

The first term (F1), i.e. the BRDF, is then further segmented into a first sub-term corresponding to a color table depending on illumination and observation direction $\chi(\bar{i}, \bar{o})$ and a second sub-term corresponding to an intensity function $$\left(\frac{a}{\pi} + \Sigma_{k=1}^3 f_{S_k, a_k, F_{0,k}}^{CT}(\bar{\tau}, \bar{o})\right).$$

Afterwards, a color difference between the captured spectral reflectance data and the initial BTF is minimized by optimizing in a first optimization step the parameters of the first sub-term while the parameters of the second sub-term are kept constant, and by optimizing in a second optimization step the parameters of the second sub-term while the parameters of the first sub-term are kept constant.

The optimization of the color table in the first optimization step for each spectral measurement geometry may be performed as follows: first CIE L*a*b* values are computed from the spectral reflectance data (curves) obtained in the second step, second CIE L*a*b* values are computed from the initial BTF, and correction vectors in a* and b* coordinates are computed by subtracting the second CIE La*b* values from the first CIE La*b* values. These correction vectors are then component-wise interpolated and extrapolated for the complete range of viewing and illumination angles stored in the color table and the interpolated correction vectors are applied to the initial BTF CIE L*a*b* values for each spectral measurement geometry stored in the color table. The obtained corrected BTF CIE L*a*b* values are then transformed to linear sRGB coordinates which are normalized (so that their sum is, for example, equal to 3) and finally stored in the color table. A multilevel B-Spline interpolation algorithm (see Lee, Seungyong, et al, "Scattered data interpolation with multilevel B30 splines", IEEE transactions on visualization and computer graphics, Vol. 3, 1997, pages 228 to 244) may be used for the component-wise interpolation and extrapolation of the correction vectors.

The optimization of the parameters of the intensity function in the second optimization step may be performed by defining a cost function based on the sum of the color differences across all spectral reflectance measurements geometries. The cost function $C(\alpha, S, F_0, a)$ is defined across all reflectance measurement geometries according to equation (2):

$$C(\alpha, S, F_0, a) = \tag{2}$$
$$\sum\nolimits_{g \in G} \Delta E(f(x, \bar{\tau}, \bar{o}) \cdot F_{CC}(i, o), f_{Ref}(\bar{\tau}, \bar{o})) + P(\alpha, S, F_0, a)$$

with
G: the set of measurement geometries for which spectral reflectance data is available
g: one out of the set of measurement geometries
$\Delta E(f_{Test}, f_{Ref})$: a weighted color difference formula measuring the difference between the colors $f_{Test}$ and $f_{Ref}$
$f_{Ref}(\bar{i}, \bar{o})$: reference color derived from spectral measurement
$f_{Test} = f(x, \bar{i}, \bar{o}) \cdot F_{CC}(i, o)$: test color computed from the initial BTF for the given illumination and observation direction
$\alpha = (\alpha_1, \alpha_2, \alpha_3)$: vector of parameters for the Beckmann distribution of the three Cook-Torrance lobes
$S = (S_1, S_2, S_3)$: vector of weights for the three Cook-Torrance lobes
$F_0 = (F_{0,1}, F_{0,2}, F_{0,3})$: vector of Fresnel reflections for the three Cook-Torrance lobes
$P(\alpha, S, F_0, \alpha)$: penalty function.

As indicated in equation (2) the cost function can be supplemented by a penalty function which is designed to take specific constraints into account. Such constraints may be used, for example, to keep the parameter values in a valid range. To compute the color difference, the initial BTF is evaluated at the different spectral reflectance measurement geometries and the resulting CIE L*a*b* values are compared to the CIE L*a*b* values from the spectral reflectance measurements using a weighted color difference formula such as, for example, the formula defined in DIN 6157/2, and the parameters of the intensity function are optimized using a non-linear optimization method, such as, for example the Nelder-Mead-Downhill-Simplex method, so that the cost function is minimized.

The first and the second optimization steps may be run repeatedly/iteratively to further improve the accuracy of the optimized BTF. The number of iterations can be specified and pre-defined. It has been found that three iterations can already yield reliable good results. The optimized BTF is more accurate than the initial BTF which is obtained directly from the camera-based device, thus resulting in a higher color accuracy compared to the measured color when displaying colors using the optimized BTF.

Displaying the pre-existing color library may include providing object data of a virtual object and rendering the color data present in the pre-defined color library and the provided object data using predefined illumination conditions. Predefined lighting conditions may include direct light sources (also called analytic light sources), such as point light sources, directional light sources or spotlights, or high dynamic range (HDR) environment maps, in particular high dynamic range (HDR) environment maps. Rendering processes using direct light sources are known in the state of the art and can be performed in real time (see for example OpenGL shading language, Rost, R. J., et. al., AddisonWesley Professional, 2009). Rendering processes using high dynamic range (HDR) environment maps are known in the state of the art as image-based lightning (see for example Debevec, Paul "Image-Based Lighting", IEEE Computer Graphics and Applications, March/April 2002, pages 37 to 34). In these processes, real or virtual objects are illuminated with images of light from the real world by capturing real-world illumination as an omnidirectional, high dynamic range image, mapping the illumination onto a representation of the environment, placing a computer graphics object inside the environment and simulating the light from the environment illuminating the computer graphics object. Rendering results using image-based lightning are therefore perceived as more realistic due to the use of real-world illumination. It may therefore be preferred to perform the rendering process using image-based lightning to obtain a more realistic image of the colored object. The virtual object may be selected from virtual 2D objects, such as colored areas, or virtual 3D objects, such as color chips, dome shapes, automotive bodies or parts of such automotive bodies. The automotive body or part thereof may be a generic or a specific automotive body or part thereof. The term "generic automotive body or part thereof" refers to an automotive body or part thereof being a generic representation of a vehicle class, such as a car, a motorcycle etc. Such generic body is merely used to represent the general geometry of the respective vehicle class but is normally not manufactured. In contrast, the term "specific automotive body or part thereof" refers to an automotive body or part thereof having the same geometry as a real automotive body being manufactured. Data on the virtual object may be stored on a computer readable medium, such as the memory of the display device or a database connected via a communication interface with the display device. In one example, the user may be able to select the virtual object prior to rendering. For this purpose, available virtual objects may be displayed to the user on the screen of the display device and the user may select the desired object via the interaction element. Object data associated with the selected virtual object is then retrieved by the processor from the computer readable medium prior to rendering. In another example, a predefined virtual object is used for rendering. The virtual object used for rendering may also be a colored virtual object. In one example, color data associated with available or predefined virtual objects is retrieved by the processor based on the selected or predefined virtual object. In another example, the user can select a color from a pre-exiting color library displayed on the screen of the display device as previously disclosed. The color data associated with the selected color is then retrieved from a computer readable medium, such as the memory of the display device or a database, prior to rendering. Use of colored virtual objects allows the user to display the overall visual impression of the object if the selected color is combined with a further colored coating layer. This may be preferred if the colored coating layer is a tined clearcoat with is to be combined with an underlaying colored basecoat layer because the color of the basecoat layer is at least partly visible through the tinted clearcoat layer due to its at least partial transparency. The displayed pre-existing color library may be manipulated, for example by zooming, moving, turning and/or scrolling, via the interaction element to increase user comfort upon browsing through the displayed library.

The pre-existing color library may be stored on a computer readable medium and may be provided via a communication interface to the computer processor performing the rendering step previously disclosed. The computer readable medium may be a memory of the display device or may be an external storage device, such as a database, connected via a communication interface, in particular a wireless communication interface, with the display device. The user may select a color from the displayed pre-existing color library via an interaction element, present within the display device or coupled to the display device via a communication interface. After selecting the desired color from the displayed pre-existing color library, the digital representation of the coating layer may be obtained by searching a database for said digital representation based on the selected color. Displaying a pre-defined color library allows the user to select a colored coating layer having a color which is close to the desired color, thus reducing the need of significant changes to the colored coating material in order to obtain the desired color and therefore increasing the chances that the desired color can be obtained quickly from the selected color by making only minor modifications.

In an aspect, the display device is a mobile or a stationary display device, preferably a mobile display device. Stationary display devices include computer monitors, television screens, projectors etc. Mobile display devices include laptops or handheld devices, such as smartphones and tablets.

The screen of the display device may be constructed according to any emissive or reflective display technology with a suitable resolution and color gamut. Suitable resolutions are, for example, resolutions of 72 dots per inch (dpi) or higher, such as 300 dpi, 600 dpi, 1200 dpi, 2400 dpi, or higher. This guarantees that the generated color data can displayed in a high quality. A suitably wide color gamut is that of standard Red Green Blue (sRGB) or greater. In various embodiments, the screen may be chosen with a color gamut similar to the gamut perceptible by human sight. In an aspect, the screen of the display device is constructed according to liquid crystal display (LCD) technology, in particular according to liquid crystal display (LCD) technology further comprising a touch screen panel. The LCD may be backlit by any suitable illumination source. The color gamut of an LCD screen, however, may be widened or otherwise improved by selecting a light emitting diode (LED) backlight or backlights. In another aspect, the screen of the display device is constructed according to emissive polymeric or organic light emitting diode (OLED) technology. In yet another aspect, the screen of the display device may be constructed according to a reflective display technology, such as electronic paper or ink. Known makers of electronic ink/paper displays include E INK and XEROX. Preferably, the screen of the display device also has a suitably wide field of view that allows it to generate an image that does not wash out or change severely as the user views the screen from different angles. Because LCD screens operate by polarizing light, some models exhibit a high degree of viewing angle dependence. Various LCD constructions, however, have comparatively wider fields of view and may be preferable for that reason. For example, LCD screens constructed according to thin film transistor (TFT) technology may have a suitably wide field of view. Also, screens constructed according to electronic paper/ink and OLED technologies may have fields of view wider than many LCD screens and may be selected for this reason.

In an aspect, step (i) further includes displaying the color associated with the provided digital representation of the colored coating layer on the screen of the display device. The "color associated with the provided digital representation" refers to the color of a coating layer prepared from a coating material, wherein the provided digital representation contains data on said coating material, such as the formulation of the coating material. In one example, the step of displaying the color associated with the provided digital representation of the colored coating layer on the screen of the display device may further include obtaining color data associated with the provided digital representation of the colored coating layer and displaying the obtained color data. Obtaining color data associated with the provided digital representation may include retrieving said color data from a computer readable medium, such as a database based on the provided digital representation and providing the retrieved color data. The color data may be colorimetrically measured color data or calculated color data as described previously. In another example, the provided digital representation already contains color data associated with the formulation of the colored coating material. In this case, said color data does not have to be obtained prior to displaying the color data. Displaying the obtained color data may include providing object data of a virtual object and rendering the provided color data and the provided object data using predefined illumination conditions. The predefined illumination conditions, rendering process as well as the virtual object may be the same as previously described. This aspect allows the user to select a virtual object corresponding to the real object for which a color should be designed such that the visual impression of the colored virtual object is displayed as realistic as possible. Moreover, this allows the user to check whether the selected color is corresponding to the desired starting color to be used for the design process and thus allows the user to correct the starting color in case a wrong starting color was selected, for example by entering an incorrect color identification data or by selecting a wrong color from the pre-existing library previously described.

In step (ii) of the inventive method, a user input is detected with the computer processor via an interaction element. In one example, the interaction element may be a physical interaction element, such as an input device or input/output device, in particular a mouse, a keyboard, a trackball, a touch screen or a combination thereof. In another example, the interaction element may be the projection area in which a user input in the form of a gesture, such as a finger gesture or motion of the hand, is received.

In an aspect, detecting via the interaction element a user input includes displaying at least part of the ingredients being present in the coating material used to prepare the colored coating layer on the screen of the display device, manipulating at least one displayed ingredient via the interaction element and detecting said manipulation. With preference, at least part of the ingredients known to have an influence on the color of the coating layer, such as pigment (s), binders, fillers, matting agents, other components having an influence on the color of the coating layer or a combination thereof, are displayed on the screen of the display device. The user input thus corresponds to the manipulation of the formulation of the coating material and is detected with the computer processor of the display device. The use of the formulation of the coating material as a basis for the modification of its color allows to study the influence of the pigmentation on the color and thus allows to design the desired visual appearance in a very intuitive way.

In one example, the step of displaying at least part of the ingredients being present in the coating formulation used to prepare the colored coating layer on the screen of the display device may include displaying at least one adjustment tool comprising a plurality of regulators, each regulator corresponding to the type and amount of an ingredient being present in the coating material. "Adjustment tool" may refer to a part of a graphical user interface which allows to modify at least part of the displayed ingredients of the coating material. The use of an adjustment tool provides user guidance with respect to the manipulation of the types/ amounts of ingredients, thus allowing for an easy design of the desired color.

The step of manipulating at least one displayed ingredient via the interaction element may comprise adjusting the type and/or amount of at least one displayed ingredient via the interaction element. In one example, this may include moving at least one regulator of at least one displayed adjustment tool via the interaction element.

The at least one adjustment tool may be generated from the provided digital representation of the coating layer. This may include determining with the computer processor data on the formulation of the coating material used to prepare the colored coating layer comprised in the provided digital representation of the colored coating layer and generating at least one adjustment tool based on the determined data. The term "generating at least one adjustment tool based on the generated data" preferably refers to generating an adjustment tool adapted to the determined data, i.e. the regulators of the adjustment tool match the determined data and the adjustment tool does not contain any regulators for ingredients of the formulation which are not present in the respective formulation of the coating material. Thus, this term refers to generating an adjustment tool adapted to the determined data and does not embrace using a pre-defined adjustment tool which is merely filled with the determined data. For example, an adjustment tool generated based on a determined solid color coating formulation, i.e. a coating formulation not comprising any effect pigments, does not contain a regulator for effect pigments, while an adjustment tool generated for an effect color coating formulation containing effect pigment(s) contains at least one regulator for effect pigments. Generation of an adjustment tool adapted to the determined data allows to provide a better overview of the ingredients present in the coating formulation and avoids that the user uses regulators for coating ingredients which are not present in the formulation of the coating material. This ensures that the adapted formulation of the coating material is producible and results in an applied coating layer having the required quality and thus avoids creating modified coating formulations which cannot be produced, applied or result in coating layers not fulfilling the required optical and mechanical quality. In one example, the adjustment tool may be a box having a plurality of visually distinct compartments, each compartment being indicative of a type of ingredient being present in the coating material, the size of each compartment being indicative of the amount of the respective ingredient and the plurality of regulators corresponding to visual elements, in particular lines, separating the compartments. The type of ingredient may be displayed in the compartment using a graphical representation being indicative of the ingredient type. The graphical representation may be obtained from the provided digital representation of the colored coating layer and may be selected from images, such as color chips for colored pigments, metal pieces for metallic effect pigments, glass pieces for glass flakes, solid blocks for binders etc. The use of a box having compartments of different sizes and comprising graphical representations of specific ingredients provides an easy overview of the relevant ingredients and allows to easily asses the influence of the type/amount of each ingredient on the resulting color of the coating layer by changing the size of the compartments and/or the ingredients being present in the compartments.

Step (ii) may further include providing the detected user input via a communication interface to the computer processor. In one example, the user input may be detected by a processor connected via a communication interface with the interaction element and may be provided to the computer processor via a further communication interface connecting the two processors. This may be preferred if a touch panel is used which comprises a panel processor to detect touch screen gestures. The detected touchscreen gestures are then provided via a communication interface to the computer processor which may be present within or outside of the display device. In another example, the user input may be detected with the computer processor present inside the display device. This may be preferred if an external input device is used as interaction element.

In step (iii) of the inventive method, the detected user input is converted with the computer processor into a modified digital representation of the colored coating layer. This may include converting the detected user input into modified formulation data of the colored coating material used to prepare the colored coating layer. The modified formulation data of the colored coating material preferably comprises numerical values and is reflecting to the modification(s) of ingredients of the coating material performed by the user as previously described. Converting the detected user input may therefore include modifying the numerical values of the formulation data of the non-modified colored coating material, wherein the modification reflects the detected user input. In one example, the conversion is performed by a computer processor present inside the display device. In another example, the conversion is performed by a further computer processor being present outside of the display device, in particular being present inside another computing device, by providing the user input to said further processor via a communication interface and performing the conversion based on the provided user input.

In optional step (iv), steps (i) to (iii) are repeated at least once. This may be preferred if at least one further colored coating layer is present on the object and the color of the at least one further coating layer should also be modified. In this case, the user may select whether the color data is generated in step (v) for all modified digital representations as described below or only for part of the modified digital representations. In case the color data is generated in step (v) for all modified digital representations, the displayed generated color data corresponds to the visual impression resulting from the color of all coating layers for which steps (i) to (iii) were performed. This may be preferable if a colored basecoat is to be combined with a tinted clearcoat and both the color of the colored basecoat as well as the color of the tinted clearcoat is to be modified.

In step (v) of the inventive method, color data of the coating layer(s) is generated with the computer processor based on the modified digital representation(s) of the colored coating layer(s). If steps (i) to (iii) are repeated, the user may select whether color data of coating layer(s) based on all modified digital representation(s) obtained by performing steps (i) to (iii) at least twice should be generated in step (v) or whether color data of selected modified digital representation(s) should be generated in step (v). In the first case, the generated color data displayed in step (vi) described below corresponds to the visual impression of a combination of the colored coating layers. In the latter case, the generated color data displayed in step (vi) corresponds to the visual impression of the selected colored coating layer(s) and color data of modified digital representation(s) not selected in step (v) may be generated upon repetition of (v) to (vi) as described below. The latter case may be preferred if the visual impression of each colored coating layer generated by modifying a digital representation of at least 2 colored coating layers is to be evaluated individually before evaluation the visual impression obtained upon combination of the at least 2 colored coating layers. In one example, the color data is generated with the computer processor being present inside the display device. In another example, the color data is generated to with a further processor being present outside of the display device, in particular being present inside another computing device, by providing the modified digital representation to said further computer processor. This may be preferred if the computing power of the processor of the display device is not high enough to generate the color data associated with the modified digital representation within an acceptable time.

In an aspect, the step of generating color data based on the modified digital representation(s) of the colored coating layer(s) includes obtaining color data based on the modified digital representation(s), in particular based on the modified formulation data of the colored coating material(s). The step of obtaining color data may include retrieving color data from a database or lookup table based on the provided data of the modified formulation of the colored coating material. In one example, the step of retrieving color data from a database or lookup table may include comparing the retrieved color data to predefined tolerances. Predefined tolerances may include color distances, appearance distances or a combination thereof. This allows to provide the best matching color data. Retrieving the color data from a database or lookup table rapidly provides the desired color data, thus allowing to display the influences of the modifications of the digital representation, in particular the formulation of the coating material, on the color of the coating layer in real-time, resulting in an efficient designing process. In one example, the color data of this aspect may be obtained by the processor of the display device because the retrieval and optional comparison to predefined tolerances does not require a large amount of computing power. In another example of this aspect, the display device may request a further processor not being present inside the display device to retrieve the color data from the database or lookup table. The retrieved color data is then forwarded via a communication interface to the display device and the display device. In this case, the optional comparison to predefined tolerances may either be performed by the display device or by the further processor prior to forwarding the color data to the display device. This may be preferred if the database or lookup table is not present on a data storage medium inside the display device.

In an alternative aspect, the step of generating color data based on the modified digital representation(s) of the colored coating layer(s) includes using a data driven model parametrized on color data of historical coating layers and historical formulations of colored coating materials used to prepare the historical coating layers to calculate color data from the modified digital representation(s) of the colored coating layer(s), in particular from modified formulation data of the colored coating material(s). "Data driven model" may refer to a model at least partially derived from data. Use of a data driven model can allow describing relations, that cannot be modelled by physico-chemical laws. The use of data driven models can allow to describe relations without solving equations from physico-chemical laws. This can reduce computational power and can improve speed. The data driven model may be derived from statistics (Statistics 4th edition, David Freedman et al., W. W. Norton & Company Inc., 2004). The data driven model may be derived from Machine Learning (Machine Learning and Deep Learning frameworks and libraries for large-scale data mining: a survey, Artificial Intelligence Review, Vol. 52, 2019, pages 77 to 124). The data driven model may comprise empirical or so-called "black box models". Empirical or "black box" model may refer to models being built by using one or more of machine learning, deep learning, neural networks, or other form of artificial intelligence. The empirical or "black box" model may be any model that yields a good fit between training and test data. Alternatively, the data driven model may comprise a rigorous or "white box" model. A rigorous or "white box" model refers to models based on physico-chemical laws. The physico-chemical laws may be derived from first principles. The physico-chemical laws may comprise one or more of chemical kinetics, conservation laws of mass, momentum and energy, particle population in arbitrary dimension, physical and/or chemical relationships. The rigorous or "white box" model may be selected according to the physico-chemical laws that govern the respective problem. The data driven model may also comprise hybrid models. "Hybrid model" refers to a model that comprises white box models and black box models, see e.g. review paper of Von Stoch et al., Computers & Chemical Engineering, Vol. 60, 2014, pages 86 to 101. Data driven models parametrized on color data of historical coating layers and historical formulations of colored coating materials used to prepare the historical coating layers are well known in the state of the art and are disclosed, for example, in US20020184167A1 and US20190078936A1. Such data driven models derive constants from historical data and use said derived constants to predict the color data for an unknown formulation of a coating material. The predicted color data may be stored on a computer readable medium, such as a database, and may be retrieved for generating color data at a later point in time. This allows to reduce the computing time necessary to generate the color data and thus increase the efficiency of the method. This aspect may be performed on a computer processor being present in a computing device outside of the display device to reduce computing time because the computing power of the processor of the display device might not be sufficient for performing color data calculation within acceptable time frames. The color data calculated by the computer processor in the computing device is the transferred to the processor of the display device via a communication interface for display of the generated color data in step (vi) as described hereinafter.

In step (vi) of the inventive method, the generated color data received from the processor is displayed on the screen of the display device. In an aspect, the step of displaying the generated color data received from the processor on the screen of the display device includes providing object data of a virtual object, optionally providing further color data of at least one further coating layer and rendering the generated color data, the provided object data and optionally the provided further color data using predefined illumination conditions. In one example, the rendering is performed by the processor of the display device. In case the color data is generated with this processor, the processor can use the generated color data directly. In case the color data is generated with a further processor, the generated color data is provided to the processor of the display device via a communication interface prior to rendering. In another example, the rendering is performed by a further processor present outside of the display device and the rendering result is provided to the processor of the display device via a communication interface for display on the screen. This may be preferred if the computing power of the processor of the display device is insufficient to perform the rendering within an acceptable time, i.e. if the processor of the display device is not able to render at least 25 images within a second. The step of providing further color data may include selecting at least one further color of a colored coating layer, in particular from a pre-existing color library such as previously described and providing the color data associated with the selected color to the processor prior to rendering. The virtual object and predefined illumination conditions may be the same as previously described. The rendering may be performed as previously described. The rendered object may be placed in front of a predefined background or a background selected by the user via a GUI displayed on the screen of the display device. The background may be a uniform color, comprising different colors or may be a photograph of an environment. Selection of a background by the user may either comprise selecting a background from a plurality of displayed predefined backgrounds via the interaction element or providing a background by the user. The selected background may then be retrieved from a data storage medium based on the user selection and provided to the computer processor. Providing a background by the user may include retrieving a background, such as a stored image, from a data storage medium, or acquiring a photograph of the environment with the illumination sensor of the display device and providing the retrieved background or acquired photograph to the computer processor. Selection of a background by the user allows the user to display the rendered object in a desired environment, thus obtaining a better impression of the appearance of the object under real world conditions.

In an alternative aspect, the step of displaying the color data received from the processor on the screen of the display device includes automatically updating the color displayed on the screen of the display device in step (i) in response to performing steps (ii) to (vi). The step of automatically updating the color displayed on the screen of the display device may comprise providing object data of a virtual object, optionally providing further color data of at least one further coating layer, rendering the generated color data, the provided virtual object data and optionally the provided further color data using predefined illumination conditions and updating the previously displayed color with the rendering result. The virtual object, the further color data, the predefined illumination conditions and the rendering processes may be the same as previously disclosed. Automatically updating the color displayed in step (i) allows to visualize the modifications of the formulation performed by the user and thus provides an interactive guidance of the design process.

In optional step (vii), steps (i) to (vi) or steps (ii) to (vi) or steps (v) to (vi) previously described are repeated. This allows to modify the formulation of the coating material until the desired color is obtained (by repeating steps (ii) to (vi)), to select a new starting color (by repeating steps (i) to (vi)) as a basis for the design process or to generated color data for modified digital representations for which the color data was not determined in step (v) (by repeating steps (v) and (vi)). In case steps (i) to (vi), (ii) to (vi) or (v) and (vi) are repeated, the step of displaying on the screen of the display device the generated color data may include automatically updating the color displayed on the screen of the display device in step (vi) in response to repeating steps (i) to (vi) or in response to repeating steps (ii) to (vi) or in response to repeating steps (v) and (vi). Automatically updating the color displayed in step (i) or (v) allows to visualize the modifications of the formulation performed by the user and thus provides an interactive guidance of the design process.

In an aspect, step (vi) further comprises storing the generated color data and/or the displayed color on a computer readable medium. "Displayed color" may refer to the result of the rendering process as previously described and may comprise storing the data resulting from the rendering process. Storing the generated color data and/or displayed color may increase the speed of the design process because the stored data can be retrieved quickly in case it is required once again and does not have to be generated once again by calculation. The data may be associated with the modified digital representation and stored in a database which may be accessible to users performing the design method claimed herein. This allows to build a database containing generated color data during use of the inventive method and allows to increase the speed of step (v) because the color data does not have to be generated by can be retrieved from the database.

In an aspect, step (vi) further comprises adding the displayed color to a pre-existing color library or to a newly generated color library to generate a modified color library. The newly generated color library may be generated by the user prior to addition of a first color to said library and therefore does not contain any colors prior to addition of a displayed color to said library. The modified color library may be associated with a stored user profile for future use of the modified color library in designing the color of a colored coating layer. This allows the user to store and retrieve the designed color(s) and to modify the designed color(s) at a later point in time. The user may also remove at least one added color from the modified color library. In one example, the user may also sort the colors being present in the pre-existing or modified color library according to a grouping criterion to create a sorted color library. The sorted color library may be associated with a stored user profile for future provision of the sorted color library. The sorted color library may represent a favorite list. The grouping criterion may be feely chosen by the user or may be a predefined criterion displayed on the screen for user selection and may be, for example, newly designed colors, recently selected colors etc.

In an aspect, the method further comprises the steps of (viii) determining with the computer processor if the modified digital representation of the colored coating layer is within at least one predefined tolerance;

(ix) optionally in accordance with the determination that the modified digital representation is within at least one predefined tolerance: providing via the communication interface the modified digital representation to a coating material manufacturing site and optionally manufacturing the coating material based on the provided modified digital representation;

(x) optionally in accordance with the determination that the modified digital representation is outside at least one predefined tolerance: displaying at least one recommendation on the screen of the display device; and (xi) optionally in accordance with the determination that the modified digital representation is outside at least one predefined tolerance: repeating steps (i) to (vi) or steps (ii) to (vi) or steps (i) to (xi) or steps (ii) to (xi).

Further step (viii) allows to guarantee that the color designed by the user fulfills certain predefined tolerances. Such tolerances may be selected from a maximum or minimum amount of an ingredient, an allowable combination of at least part of the ingredients and combinations thereof. The ingredient(s) may be pigments, binders, solvents or further ingredients being present in the coating material used to prepare the colored coating layer. In particular, a maximum or minimum amount of certain pigment types and/or binders and/or an allowable combination of pigment types and/or binders may be selected as predefined tolerances. The predefined tolerances may be stored on a storage device, such as a database, and may be provided via a communication interface to the computer processor performing step (viii). The step of determining if the modified digital representation of the coating layer is within at least one predefined tolerance may comprise comparing data of the modified formulation of the coating material contained in the modified digital representation with at least one predefined tolerance using a computer processor, in particular the computer processor of the display device. The comparison may be performed by using a rigorous model. The rigorous model may be selected according to the physico-chemical laws that govern the respective problem.

In optional step (ix), the modified digital representation is provided to a coating material manufacturing site in case the modified digital representation is within at least one, in particular within all, predefined tolerance(s). The modified digital representation preferably comprises the modified formulation obtained by converting the user input received via the interaction element. In one example, the step of providing the modified digital representation of the coating layer to the coating material manufacturing site includes providing via a communication interface formulation data associated with the modified digital representation to a processing unit located at the coating material manufacturing site. In another example, the step of providing the modified digital representation of the coating layer to the coating manufacturing site includes providing via a communication interface formulation data associated with the modified digital representation to a computer readable medium, such as a database or a cloud. This computer readable medium may then be accessed by the processing unit located at the coating manufacturing site prior to manufacturing the coating material based on the provided modified representation. In one example, the modified digital representation is automatically provided to the coating manufacturer without any user interaction if at least one predefined tolerance, in particular if all predefined tolerances, are met by the modified representation of the coating material. A message may be displayed on the screen of the display device or an email may be sent to the user to inform the user about the status of the data transfer to the coating material manufacturing site. In another example, the user may have to actively provide the modified digital representation to the coating material manufacturing site by clicking on a respective button on the screen of the display device.

Step (ix) may further include manufacturing the coating material based on the provided modified digital representation. For this purpose, the provided modified digital representation may be adapted or converted, in particular by the processing unit located at the coating material manufacturing site, such that if fulfills predefined manufacturing requirements or data formats needed for the manufacturing process. The manufactured coating material may then be applied to a substrate, such as a metal plate or dome shape relief, using commonly known application techniques and thermally cured. The obtained cured colored coating layer may optionally be coated with a cured clearcoat layer and may then be provided to the user and compared by the user to the color designed in steps (i) to (vi). This step ensures that the color designed by the user in steps (i) to (vi) can be produced by the coating manufacturer based on the provided modified digital representation. In case the colored coating layer does not match the expectations of the user, the user may either repeat steps (i) to (ix) or the coating manufacturer may adapt the formulation of the coating material to provide a better matching colored coating layer.

If the determination performed in step (viii) reveals that the modified digital representation does not fulfil at least one predefined tolerance, at least one recommendation may be displayed to the user on the screen of the display in optional step (x). The recommendations may be stored on a computer readable medium, such as a database. In an example, the computer processor may access a database containing the recommendation(s) and may retrieve respective recommendation(s) based on the result of the determination. Said retrieved recommendation(s) is then displayed to the user on the screen of the display device. An example recommendation may be "Formulation requirements not fulfilled. Please modify the type/amount of pigment(s)".

If the determination performed in step (viii) reveals that the modified digital representation does not fulfil at least one predefined tolerance, steps (i) to (vi) or steps (ii) to (vi) may be repeated. It may be preferred to perform this step after displaying the recommendation(s) to provide user guidance with respect to modifications necessary to fulfil the pre-defined tolerance(s).

Embodiments of the Inventive System

The aforementioned systems may further comprise at least one database. Such database may comprise the digital representation(s) of colored coating layer(s) or color data associated with formulations of coating materials or a data driven model parametrized on color data of historical coating layers and historical formulations of colored coating materials used to prepare the historical coating layers to calculate color data from the modified digital representation(s) of the colored coating layer(s) or object data of a virtual object, in particular at least one virtual 2D or 3D object as described previously. The aforementioned databases may be used in any combination.

In an aspect, the systems further comprise a device for measuring color data of colored coating layers. Suitable devices for measuring color data are well known in the state of the art.

Further embodiments or aspects are set forth in the following numbered clauses:

1. A method for designing the appearance of an object being coated with at least one colored coating layer, said method comprising the steps of:
    (i) providing to a computer processor via a communication interface a digital representation of a colored coating layer for display on a screen of a display device;
    (ii) detecting with the computer processor via an interaction element a user input;
    (iii) converting with the computer processor the detected user input into a modified digital representation of the colored coating layer;
    (iv) optionally repeating steps (i) to (iii);
    (v) generating with the computer processor color data of the coating layer(s) based on the modified digital representation(s) of the colored coating layer(s);
    (vi) displaying on the screen of the display device the generated color data received from the processor; and
    (vii) optionally repeating steps (i) to (vi) or steps (ii) to (vi) or steps (v) and (vi).

2. The method according to clause 1, wherein the at least one colored coating layer is present on at least part of the surface of the object.

3. The method according to clause 1 or 2, wherein the at least one colored coating layer is a basecoat layer or a tinted clearcoat layer.

4. The method according to any one of the preceding clauses, wherein the object is an automotive or a part thereof.

5. The method according to any one of the preceding clauses, wherein the display device comprises an enclosure housing the computer processor and the screen.

6. The method according to any one of clauses 1 to 5, wherein the display device and the computer processor performing steps (i), (ii), (iii) and (v) or steps (iii) and (v) or step (v) are configured as separate components 7. The method according to any one of the preceding clauses, wherein steps (ii) to (vi) are performed simultaneously.

8. The method according to any one of the preceding clauses, wherein the digital representation of the colored coating layer comprises data on the formulation of a coating material used to prepare the colored coating layer and optionally color data of the colored coating layer.

9. The method according to clause 8, wherein data on the formulation of a coating material used to prepare the colored coating layer comprises data on the type and amount of at least part of the ingredients being present in the coating material.

10. The method according to any one of the preceding clauses, wherein providing the digital representation of the colored coating layer comprises providing coating layer identification data, obtaining the digital representation of the coating layer based on the provided coating layer identification data and providing the obtained digital representation.

11. The method according to clause 10, wherein providing coating layer identification data includes providing color data of the coating layer and/or providing data being indicative of the colored coating layer.

12. The method according to any one of clauses 1 to 9, wherein providing the digital representation of the colored coating layer comprises displaying a pre-existing color library on the screen of the display device, selecting a color from the displayed pre-existing library, obtaining the digital representation of the colored coating layer based on the selected color and providing the obtained digital representation of the colored coating layer.

13. The method according to clause 12, wherein the pre-existing color library includes at least 2 different colors, each color corresponding to the color of a colored coating layer being prepared from a coating material and each color being defined by colorimetrically measured color data or by calculated color data, in particular by calculated color data.

14. The method according to clause 13, wherein calculated color data comprises an optimized BTF (bi-directional texture function) which is obtained by the following steps:
    determining an initial BTF for the object using a camera-based measurement device,
    capturing spectral reflectance data for the object for a pre-given number, i.e. a limited number of different measurement geometries using a spectrophotometer, and adapting the initial BTF to the captured spectral reflectance data to obtain an optimized BTF by segmenting the initial BTF of formula (1)

$$f(x, \bar{\iota}, \bar{o}) = \chi(\bar{\iota}, \bar{o})\left(\frac{a}{\pi} + \Sigma_{k=1}^{3} f_{S_k, a_k, F_{0,k}}^{CT}(\bar{\iota}, \bar{o})\right) + \Xi(x, \bar{\iota}, \bar{o}) \qquad (1)$$

in which x: surface coordinates of the sample/object

ī, ō: illumination and observation/viewing directions at the basecoat of the sample $\chi(\bar{\iota}, \bar{o})$: color table depending on illumination and observation direction $\alpha$: Albedo or diffuse reflectivity $$f_{S_k, a_k, F_{0,k}}^{CT}(\bar{\iota}, \bar{o})$$

the k-th Cook-Torrance lobe; the Cook-Torrance lobe is a commonly used BRDF that describes the glossiness of a microfacet surface $S_k$: weight for the k-th Cook-Torrance lobe $\alpha_k$: parameter for the Beckmann distribution of the k-th Cook-Torrance lobe $F_{0,k}$: Fresnel reflectivity for the k-th Cook-Torrance lobe $\Xi(x, \bar{\iota}, \bar{o})$: table of spatial texture images depending on illumination and observation direction into a term $$\chi(\bar{\iota}, \bar{o})\left(\frac{a}{\pi} + \Sigma_{k=1}^{3} f_{S_k, a_k, F_{0,k}}^{CT}(\bar{\iota}, \bar{o})\right) \qquad (F1)$$

and a term $\Xi(x, \bar{\iota}, \bar{o})$ (F2), further dividing the first term (F1) into a first sub-term corresponding to a color table depending on illumination and observation direction $\chi(\bar{\iota}, \bar{o})$ and a second sub-term corresponding to an intensity function $$\left(\frac{a}{\pi} + \Sigma_{k=1}^{3} f_{S_k, a_k, F_{0,k}}^{CT}(\bar{\iota}, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

15. The method according to any one of clauses 12 to 14, wherein displaying the pre-existing color library includes providing object data of a virtual object and rendering the color data present in the pre-existing color library and the provided object data using predefined illumination conditions.

16. The method according to clause 15, wherein predefined illumination conditions are selected from direct light sources or high dynamic range (HDR) environment maps, in particular from high dynamic range (HDR) environment maps.

17. The method according to any one of clauses 10 to 16, wherein the step of obtaining the digital representation of the coating layer is further defined as searching a database for said digital representation based on the provided data or selected color.

18. The method according to any one of the preceding clauses, wherein the display device is a mobile or a stationary display device, preferably a mobile display device.

19. The method according to any one of the preceding clauses, wherein the screen of the display device is a liquid crystal display (LCD), in particular a liquid crystal display having a touchscreen panel.

20. The method according to any one of the preceding clauses, wherein step (i) further includes displaying the color associated with the provided digital representation of the colored coating layer on the screen of the display device.

21. The method according to clause 20, wherein the step of displaying the color associated with the provided digital representation of the colored coating layer on the screen of the display device further includes obtaining color data associated with the provided digital representation of the colored coating layer and displaying the obtained color data.

22. The method according to clause 21, wherein the step of displaying the obtained color data further includes providing object data of a virtual object and rendering the obtained color data and the provided object data using predefined illumination conditions.

23. The method according to clause 22, wherein virtual object is selected from virtual 2D objects, such as colored areas, or virtual 3D objects, such as color chips, dome shapes, automotive bodies or parts thereof.

24. The method according to clause 23, wherein the virtual object is a colored virtual object.

25. The method according to any one of clauses 22 to 24, wherein predefined illumination conditions are selected from direct light sources or high dynamic range (HDR) environment maps, in particular from high dynamic range (HDR) environment maps.

26. The method according to any one of the preceding clauses, wherein the step of detecting via the interaction element a user input includes displaying at least part of the ingredients being present in the coating material used to prepare the colored coating layer on the screen of the display device, manipulating at least one displayed ingredient via the interaction element and detecting said manipulation.

27. The method according to clause 26, wherein the step of displaying at least part of the ingredients being present in the coating formulation used to prepare the colored coating layer on the screen of the display device includes displaying at least one adjustment tool comprising a plurality of regulators, each regulator corresponding to the type and/or amount of an ingredient being present in the coating material.

28. The method according to clause 26 or 27, wherein the step of manipulating at least one displayed ingredient via the interaction element comprises adjusting the type and/or amount of at least one displayed ingredient via the interaction element.

29. The method according to clause 28, wherein adjusting the type and/or amount of at least one displayed ingredient via the interaction element includes moving at least one regulator of at least one displayed adjustment tool via the interaction element.

30. The method according to any one of clauses 27 to 29, wherein the at least one adjustment tool is generated from the provided digital representation of the coating layer.

31. The method according to any one of clauses 27 to 30, wherein the adjustment tool is a box having a plurality of visually distinct compartments, each compartment being indicative of a type of ingredient being present in the coating material, the size of each compartment being indicative of the amount of the respective ingredient and the plurality of regulators corresponding to visual elements separating the compartments.

32. The method according to clause 31, wherein the type of ingredient is displayed in the compartment using a graphical representation being indicative of the ingredient type, the graphical representation being obtained from the provided digital representation of the colored coating layer.

33. The method according to any one of the preceding clauses, wherein the interaction element is a physical interaction element.

34. The method according to clause 33, wherein the physical interaction element is an input device or an input/output device, in particular a mouse, a keyboard, a trackball, a touch screen or a combination thereof.

35. The method according to any one of the preceding clauses, wherein step (ii) further includes providing the detected user input via a communication interface to at least one computer processor.

36. The method according to any one of the preceding clauses, wherein converting the detected user input into a modified digital representation of the colored coating layer includes converting the detected user input into modified formulation data of the colored coating material used to prepare the colored coating layer.

37. The method according to any one of the preceding clauses, wherein the step of generating color data based on the modified digital representation(s) of the colored coating layer(s) includes obtaining color data based on the modified digital representation(s), in particular based on the modified formulation data of the colored coating material(s).

38. The method according to clause 37, wherein the step of obtaining color data includes retrieving color data from a database or lookup table based on the provided data of the modified formulation of the colored coating material.

39. The method according to clause 37 or 38, wherein the step of retrieving color data from a database or lookup table includes comparing the retrieved color data to predefined tolerances.

40. The method according to any one of clauses 1 to 36, wherein the step of generating color data based on the modified digital representation(s) of the colored coating layer(s) includes providing a data driven model parametrized on color data of historical coating layers and historical formulations of colored coating materials used to prepare the historical coating layers and calculating color data based on the provided data driven model and the modified digital representation(s) of the colored coating layer(s), in particular from modified formulation data of the colored coating material(s).

41. The method according to any one of the preceding clauses, wherein the step of displaying the color data received from the processor on the screen of the display device includes providing object data of a virtual object, optionally providing further color data of at least one further coating layer and rendering the generated color data, the provided object data and optionally the provided further color data using predefined illumination conditions.

42. The method according to clause 41, wherein the virtual object is a 2D virtual object, such as a colored area, or a 3D virtual object, such as a color chip, a dome shape, an automotive body or a part thereof.

43. The method according to clause 41 or 42, wherein predefined illumination conditions are selected from direct light sources or high dynamic range (HDR) environment maps, in particular from high dynamic range (HDR) environment maps.

44. The method according to any one of the preceding clauses, wherein the step of displaying on the screen of the display device the generated color data includes automatically updating the color displayed on the screen of the display device in step (vi) in response to repeating steps (i) to (v) or in response to repeating steps (ii) to (vi).

45. The method according to any one of clauses 20 to 43, wherein the step of displaying the color data received from the processor on the screen of the display device includes automatically updating the color displayed on the screen of the display device in step (i) in response to performing steps (ii) to (vi).

46. The method according to clause 44 or 45, wherein the step of automatically updating the color displayed on the screen of the display device comprises providing object data of a virtual object, optionally providing further color data of at least one further coating layer, rendering the generated color data, the provided virtual object data and optionally the provided further color data using predefined illumination conditions and updating the color displayed in step (i) with the rendering result.

47. The method according to any one of the preceding clauses, wherein step (vi) further comprises storing the generated color data and/or the displayed color on a computer readable medium.

48. The method according to any one of the preceding clauses, wherein step (vi) further comprises adding the displayed color to a pre-existing color library to generate a modified color library.

49. The method according to clause 48, wherein the modified color library is associated with a stored user profile for future use of the modified color library in designing the color of a colored coating layer.

50. The method according to clause 48 or 49, further comprising removing at least one added color from the modified color library.

51. The method according to any one of clauses 48 to 50, further comprising sorting the colors being present in the pre-existing or modified color library according to a grouping criterion to create a sorted color library and optionally associating the sorted color library with a stored user profile for future provision of the sorted color library.

52. The method according to any of the preceding clauses, further comprising the steps of (viii) determining with the computer processor if the modified digital representation of the colored coating layer is within at least one predefined tolerance;

(ix) optionally in accordance with the determination that the modified digital representation is within at least one predefined tolerance: providing via the communication interface the modified digital representation to a coating material manufacturing site and optionally manufacturing the coating material based on the provided modified digital representation;

(x) optionally in accordance with the determination that the modified digital representation is outside at least one predefined tolerance: displaying at least one recommendation on the screen of the display device; and (xi) optionally in accordance with the determination that the modified digital representation is outside at least one predefined tolerance: repeating steps (i) to (vi) or steps (ii) to (vi) or steps (i) to (xi) or steps (ii) to (xi).

53. The method according to clause 52, wherein the predefined tolerance is selected from a maximum or minimum amount of an ingredient, an allowable combination of at least part of the ingredients and combinations thereof.

54. The method according to clause 52 or 53, wherein the predefined tolerance is stored on storage device and is provided via a communication interface to the computer processor.

55. The method according to any one of clauses 52 to 54, wherein the step of determining if the modified digital representation of the coating layer is within at least one predefined tolerance comprises comparing data of the modified formulation of the coating material with at least one predefined tolerance.

56. The method according to any one of clauses 52 to 55, wherein the step of providing the modified digital representation of the coating layer to the coating manufacturing site includes providing via the communication interface formulation data associated with the modified digital representation to a processing unit located at the coating manufacturing site.

57. A system for designing the color of a colored coating layer being produced from a colored coating material, said system comprising:

a communication interface for providing a digital representation of a colored coating layer for display on the screen;

a display device comprising a screen;

an interaction element for detecting a user input;

a processor in communication with the communication interface, the interaction element and the display device, the processor programmed to:

receive via the communication interface the digital representation of a colored coating layer;

detect a user input via the interaction element;

convert the detected user input into a modified digital representation of the colored coating layer;

generate color data of the coating layer based on the modified digital representation of the colored coating layer, wherein the display device receives the provided digital representation and the generated color data of the colored coating layer from the processor and displays the digital representation and the color of the coating layer.

58. A system for designing the color of a colored coating layer being produced from a colored coating material, said system comprising:

a communication interface for providing a digital representation of a colored coating layer for display on the screen;

a display device comprising a screen;

an interaction element for detecting a user input;

a first processor in communication with the communication interface, the interaction element and the display device, the processor programmed to:

receive via the communication interface the digital representation of a colored coating layer;

detect a user input via the interaction element; and optionally convert the detected user input into a modified digital representation of the colored coating layer, a second processor in communication with the first processor, the second processor programmed to:

optionally convert the detected user input into a modified digital representation of the colored coating layer; and generate color data of the coating layer based on the modified digital representation of the colored coating layer, wherein the display device receives the provided digital representation from the first processor and the generated color data of the colored coating layer form the second processor and displays the digital representation and the color of the coating layer.

59. A non-transitory computer-readable storage medium, the computer-readable storage medium including instructions that when executed by a computer, cause the computer to perform the steps according to the method of any one of clauses 1 to 56.

60. A system comprising:

an object having at least one surface; and at least one colored coating layer being present on at least part of the surface of the object, wherein the color of at least one colored coating layer was designed according to the method of any one of clauses 1 to 56.

61. Use of the method of any one of clauses 1 to 56 or the system according to clause 57 or 58 for designing the color of at least one colored coating layer being present on at least part of the surface of an object.

62. An object being coated with at least one colored coating layer, wherein the color of at least one coating layer was designed according to the method of any one of clauses 1 to 56.

BRIEF DESCRIPTION OF THE DRAWINGS

These and other features of the present invention are more fully set forth in the following description of exemplary embodiments of the invention. To easily identify the discussion of any particular element or act, the most significant digit or digits in a reference number refer to the figure number in which that element is first introduced. The description is presented with reference to the accompanying drawings in which.

DETAILED DESCRIPTION

The detailed description set forth below is intended as a description of various aspects of the subject-matter and is not intended to represent the only configurations in which the subject-matter may be practiced. The appended drawings are incorporated herein and constitute a part of the detailed description. The detailed description includes specific details for the purpose of providing a thorough understanding of the subject-matter. However, it will be apparent to those skilled in the art that the subject-matter may be practiced without these specific details.

Figure 1:
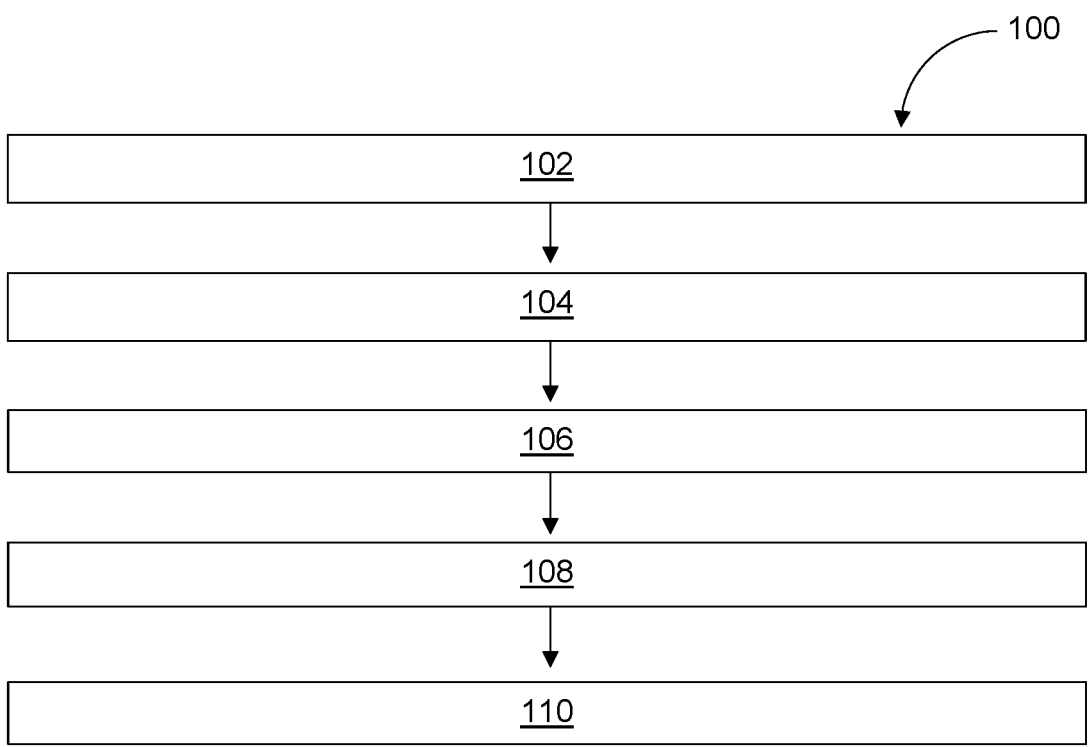
FIG. 1 is a block diagram of a method for designing the appearance of an object being coated with at least one colored coating layer

FIG. 1 depicts a non-limiting embodiment of a method for designing the appearance of an object being coated with at least one colored coating layer according to the invention. In this example, the colored coating layer is a basecoat layer and the object is an automotive or a part thereof, such as a trim part, a bumper, etc. In this example, the display device is a portable display device having an LCD screen comprising a touch screen, such as a tablet or a smartphone. In another example, the display device is a stationary device, such as a stationary computer or television screen connected via a communication interface with a computer. In this example, the display device has an enclosure housing the screen as well as the processor. In another example, the processor is present separately from the display device, for example on an external device being coupled to the display device via a wired or wireless communication interface.

In block 102, routine 100 provides to the computer processor via a communication interface the digital representation of a colored coating layer for display on the screen of a display device. The digital representation of the colored coating layer comprises data on the type and amount of at least part of the ingredients being present in the coating material used to prepare the colored coating layer. In this example, the digital representation of the colored coating layer is provided to the processor by displaying a pre-existing color library on the screen of the display device to a user, selection of a color from the displayed pre-existing library by the user, obtaining the digital representation of the colored coating layer based on the selected color and providing the obtained digital representation of the colored coating layer to the computer processor. The pre-existing library of this example contains 195 different colors, each color corresponding to the color of a colored coating layer being prepared from a colored coating material and each color being defined by color data. In this example, the color data is calculated color data comprising an optimized BTF as previously described. In another example, the color data is colorimetrically measured color data obtained by measuring the color of the colored coating layer with a suitable measuring device, such as a spectrophotometer. In this example, the pre-existing color library is displayed on the screen of the display device by providing pre-defined object data of a virtual object and rendering the color data present in the pre-existing color library and the provided object data using predefined illumination conditions (image-based lightning). The pre-defined object data of the virtual object is provided from a database via a communication interface to the processor. In this example, the virtual object is a 3D virtual object having a dome shape. In another example, the virtual object is a 2D virtual object, such as a colored area. In this example, the user can scroll through the displayed pre-existing color library by touch screen gestures to view all colors being displayed. The user then selects the desired color from the displayed pre-defined color library via a touch screen gesture, for example by clicking on the desired colored dome shape. The touch screen gesture is detected by the display device and the digital representation is then retrieved from a database based on the detected touch screen gesture and provided via the communication interface to the processor.

In block 104, routine 100 detects with the computer processor a user input via an interaction element. In this example, the interaction element is a touch screen panel and the user input is a touch screen gesture. In another example, the interaction element may be a mouse and the user input may be a mouse click or movement of the mouse. In this example, the user input is detected by displaying a virtual object having the color selected in block 102 and at least part of the ingredients being present in the coating material used to prepare the colored coating layer on the screen of the display device, manipulating at least one displayed ingredient by the user via a touchscreen gesture and detecting said manipulation. The displayed virtual object being colored with the color selected in block 104 is obtained by rendering virtual object data, color data associated with the selected color using predefined illumination conditions as previously described. In this example, pre-defined virtual object data of part of an automotive is used and the displayed virtual object can be turned or zoomed. In another example, the user can select the virtual object and object data associated with the selected object is then retrieved from the database and used for the rendering process. Displaying the selected color provides user guidance during color design, because the user immediately sees the changes in the displayed color upon modification of the formulation of the coating material used to prepare the displayed color. In this example, the ingredients being present in the coating formulation used to prepare the colored coating layer are displayed using at least one adjustment tool comprising a plurality of regulators, each regulator corresponding to the type and amount of an ingredient being present in the coating material. With preference, the regulators correspond to ingredients known to have an influence on the color of the coating layer, such as pigment(s), binders, fillers, matting agents, other components having an influence on the color of the coating layer or a combination thereof, to avoid displaying unnecessary regulators, i.e. regulators for ingredients not having an influence on the color of the coating layer. The adjustment tool is generated by the processor from the digital representation of the colored coating layer provided in block 102 by transforming the data on the formulation of the coating material contained in said digital representation into an adjustment tool. The adjustment tool therefore only comprises regulators for ingredients present within the formulation of the respective coating material to avoid selection of incompatible ingredients by the user which can be the case if a pre-defined adjustment tool comprising regulators for all kinds of possible ingredients is filled with the data of the coating formulation. Moreover, this allows to display a clearer adjustment tool because unnecessary regulators or fields are not displayed to the user. In this example, the adjustment tool is a box having a plurality of visually distinct compartments, each compartment being indicative of a type of ingredient being present in the coating material, the size of each compartment being indicative of the amount of the respective ingredient and the plurality of regulators corresponding to lines separating the compartments. The type of ingredient is displayed in each compartment using a graphical representation being indicative of the respective ingredient type. The graphical representation is obtained from the provided digital representation of the colored coating layer by associating the formulation data contained in the provided digital representation with pre-defined images for each type of ingredient, such as color chips for colored pigments, metal pieces for metallic effect pigments, glass pieces for glass flakes, solid blocks for binders etc., and displaying said images in the respective compartment.

The use of a box having compartments of different sizes and comprising graphical representations of specific ingredients provides an easy overview of the relevant ingredients of coating materials without a deep understanding of the chemical structure and the curing chemistry and allows to easily determine the influence of the type/amount of each ingredient on the resulting color of the coating layer. In another example, the adjustment tool has the form of a list comprising the type and amount of each ingredient and the user can change the type/amount of ingredient by selecting a different ingredient or by changing the listed amount. The list is generated from the formulation data contained in the provided digital representation.

The touch screen gestures are detected with the panel processor of the touch screen panel and are provided from the panel processor to the computer processor via a communication interface.

In block 106, routine 100 converts with the computer processor the detected touch screen gestures into a modified digital representation of the colored coating layer. In this example, the detected touch screen gestures are converted into modified formulation data of the colored coating material used to prepare the colored coating layer. The modified digital representation therefore comprises formulation data of the modified coating material. The degree of modification corresponds to the touch screen gestures detected in block 104.

In block 108, routine 100 generates with the computer processor color data of the coating layer based on the modified digital representation obtained in block 106. In this example, generating color data includes providing a data driven model parametrized on color data of historical coating layers and historical formulations of colored coating materials used to prepare the historical coating layers and calculating color data based on the provided data driven model and the modified formulation data of the colored coating material. The data driven model is stored on a computer readable medium, such as a database, and is provided to the processor via a communication interface. An example of a suitable data driven model is disclosed in US20020184167A1. In another example, the color data is generated by retrieving color data from a database or lookup table based on the modified formulation data of the colored coating material. This example may include comparing the retrieved color data to predefined tolerances in order to provide the best matching color data.

In block 110, routine 100 displays the generated color data on the screen of the display device. In this example, displaying the generated color data on the screen of the display device includes automatically updating the color of the virtual object displayed in block 102 in response to performing blocks 104 to 110 by performing rendering the generated color data and the virtual object data using predefined illumination conditions as previously described in block 102 and updating the color displayed in block 102 with the rendering result of block 110.

Figure 2:
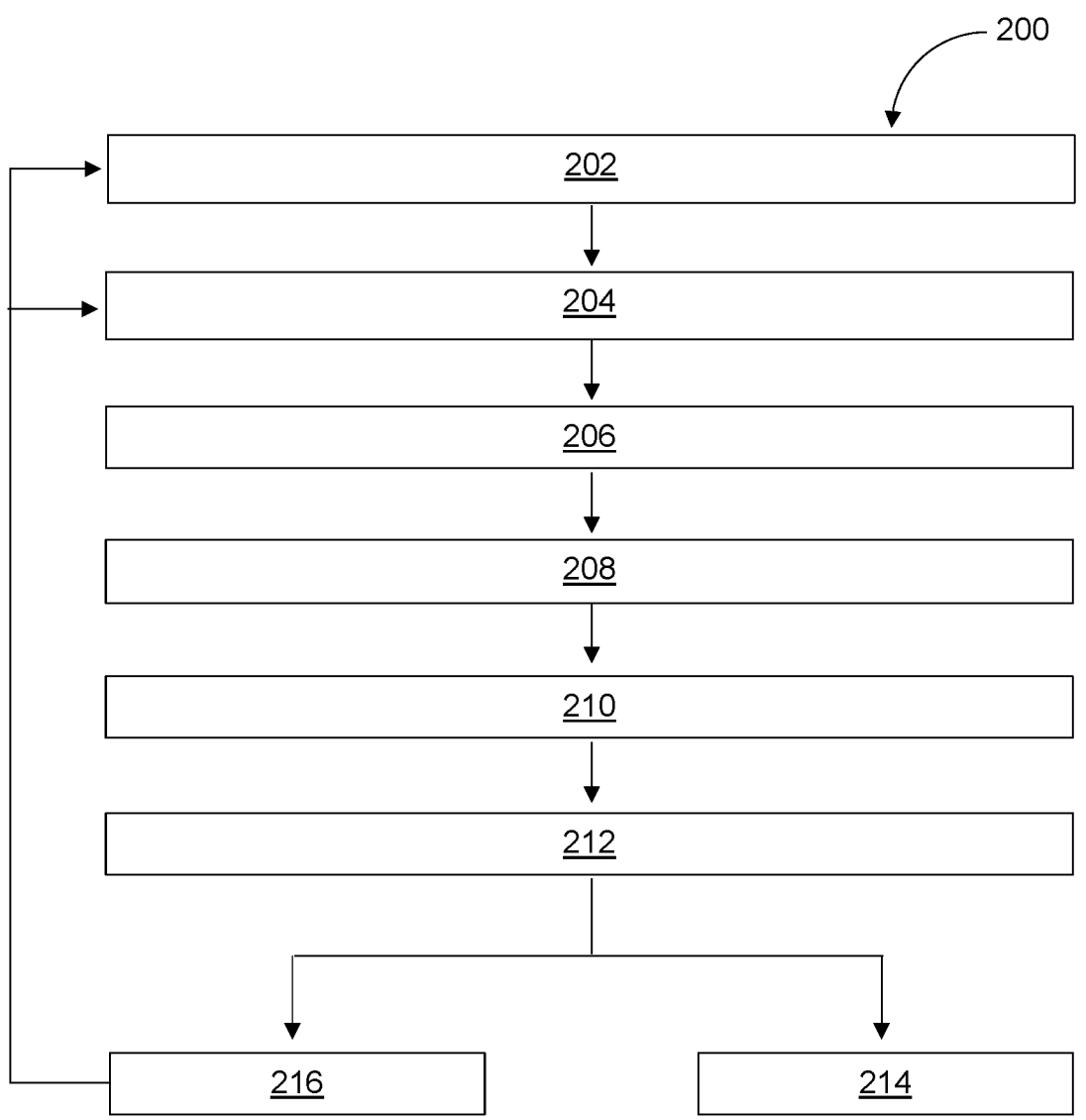
FIG. 2 is a block diagram of a preferred embodiment of the inventive method

FIG. 2 depicts a preferred non-limiting embodiment of a method for designing the appearance of an object being coated with at least one colored coating layer according to the invention. In this example, the colored coating layer is a basecoat layer and the object is an automotive or a part thereof, such as a trim part, a bumper, etc. In this example, the display device is a portable display device having an LCD screen comprising a touch screen panel, such as a tablet or a smartphone. In another example, the display device is a stationary device, such as a stationary computer or television screen connected via a communication interface with a computer. In this example, the display device has an enclosure housing the screen as well as the processor. In another example, the processor is present separately from the display device, for example on an external device being coupled to the display device via a wired or wireless communication interface.

In block 202, routine 200 provides to the computer processor via a communication interface the digital representation of a colored coating layer for display on the screen of a display device as described in connection with block 102 of FIG. 1.

In block 204, routine 200 detects with the computer processor a user input via an interaction element as described in connection with block 104 of FIG. 1.

In block 206, routine 200 converts with the computer processor the detected touch screen gestures into a modified digital representation of the colored coating layer as described in connection with block 106 of FIG. 1.

In block 208, routine 200 generates with the computer processor color data of the coating layer based on the modified digital representation obtained in block 206 as described in connection with block 108 of FIG. 1.

In block 210, routine 200 displays the generated color data on the screen of the display device as described in connection with block 110 of FIG. 1.

In block 212, routine 200 determines with the computer processor if the generated modified digital representation of the coating layer is within at least one predefined tolerance, in particular within all predefined tolerances. In this example, the predefined tolerance is selected from a maximum or minimum amount of pigment(s) and binders, an allowable combination pigments and binders and combinations thereof. The predefined tolerances may be determined by the coating manufacturer based on stability criterions, manufacturing process criterions etc. The predefined tolerance(s) is/are stored on a storage device, such as a database, and is/are provided via a communication interface to the computer processor prior to the determination. The determination is performed by comparing data of the modified formulation of the coating material comprised in the modified digital representation with at least one predefined tolerance using the computer processor. The result of the determination may be displayed to the user on the screen of the display device. In this example, the comparison is performed by the computer processor of the display device. In another example, the comparison is performed by a further computer processor being present outside the display device. For this purpose, the modified digital representation is provided via a communication interface to the further processor prior to determination and the result of the determination may be provided to the processor of the display device via said communication interface after completion of the determination.

In block 214, routine 200 provides the modified digital representation via the communication interface to a coating material manufacturing site if the determination performed in block 212 results in the modified digital representation fulfilling at least one predefined tolerance, in particular fulfilling all predefined tolerances. In this example, formulation data associated with the modified digital representation is provided via the communication interface to a processing unit located at the coating manufacturing site. For this purpose, the formulation data is provided via a communication interface to a computer readable medium, such as a cloud, with can be accessed by the processing unit located at the coating material manufacturing site via a further communication interface. In this example, the coating material is manufactured based on the provided modified digital representation, this step being generally optional. In this example, a coated substrate is prepared from the manufactured coating material and optionally a clearcoat material and provided to the user who has performed blocks 202 to 210 for quality control, this step being generally optional.

In block 216, routine 200 displays at least one recommendation on the screen of the display device if the determination performed in block 212 results in the modified digital representation not fulfilling at least one predefined tolerance. The recommendations are stored in a database and are retrieved by the processor connected via a communication interface with the database based on the result of the determination, i.e. based on which tolerance(s) is/are not fulfilled. In one example, the displayed recommendation is: "Amount of [compound X] too high. Please reduce amount or choose a different [compound]". The term in brackets is replaced in the specific example by the name of the compound being out of the predefined tolerance. The user may then return to block 202 or 204 to start the designing process to modify the color displayed in block 210 in order to generate a desired color associated with a coating material fulfilling at least one predefined tolerance.

Figure 3A:
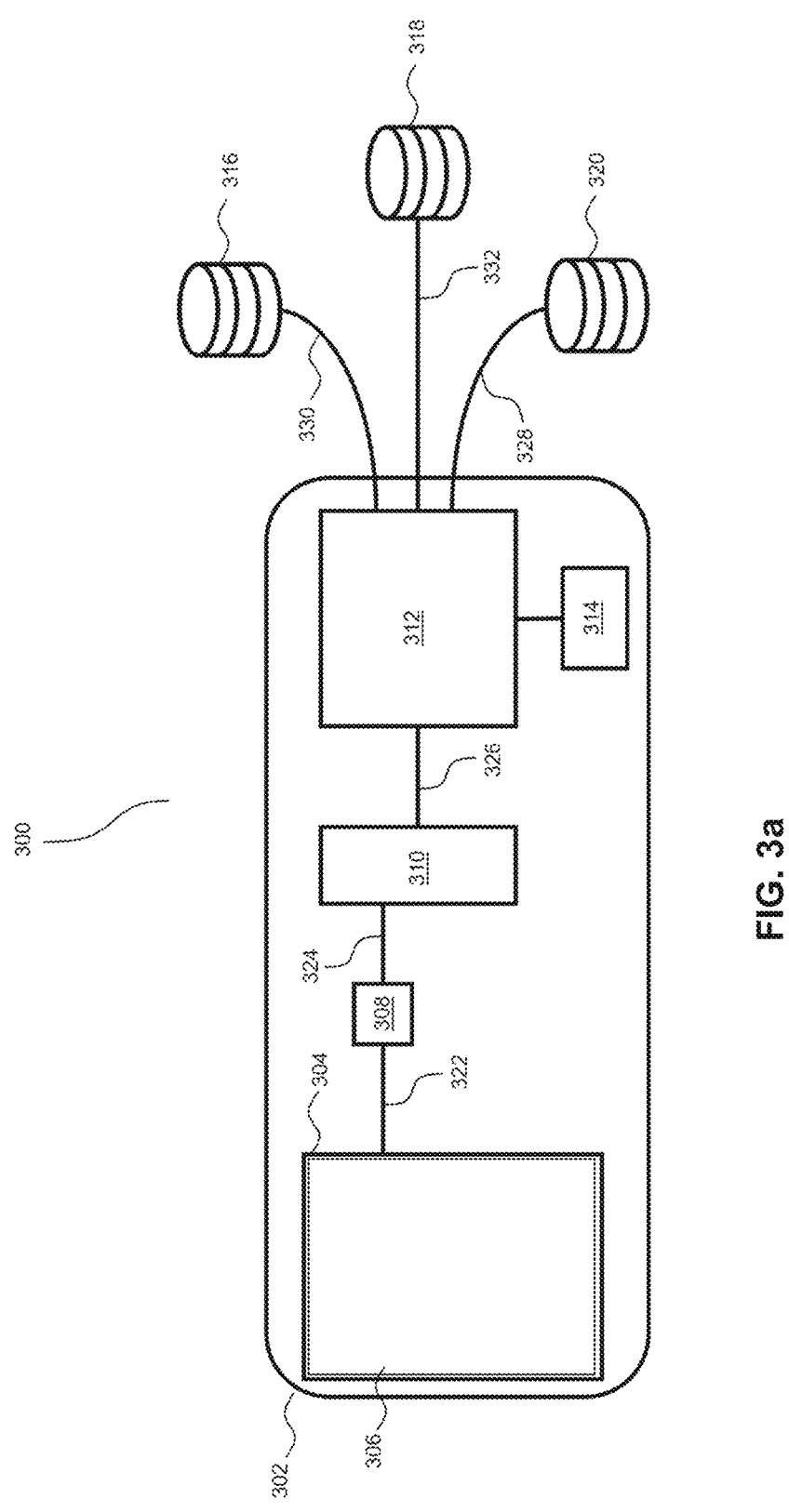
FIG. 3a illustrates a system in accordance with a first embodiment of the invention

FIG. 3*a* shows a first embodiment of a system 300 for designing the color of a colored coating layer being produced from a colored coating material. In this example, system 300 is a display device 302 which is coupled via a communication interface 328, 330, 332 to databases 316, 318, 320. As shown, computer system 300 includes a processor 312 configured to execute instructions, for example retrieved from memory 314, and to carry out operations associated with the computer system 300, namely receive via a communication interface the digital representation of a colored coating layer;

detect a user input via the interaction element;

convert the detected user input into a modified digital representation of the colored coating layer;

generate color data of the coating layer based on the modified digital representation of the colored coating layer, The processor 312 can be a single-chip processor or can be implemented with multiple components. In most cases, the processor 312 together with an operating system operates to execute computer code and produce and use data. In this example, the computer code and data resides within memory 314 that is operatively coupled to the processor 312. Memory 314 generally provides a place to hold data that is being used by the computer system 300. By way of example, memory 314 may include Read-Only Memory (ROM), Random-Access Memory (RAM), hard disk drive and/or the like.

In another example, computer code and data could also reside on a removable storage medium and loaded or installed onto the computer system when needed. Removable storage mediums include, for example, CD-ROM, PC-CARD, floppy disk, magnetic tape, and a network component.

In this example, the digital representation of a colored coating layer is received by the processor 312 from database 316 via communication interface 330. In another example, the digital representation of the colored coating layer is stored in memory 314 or on a removable storage medium previously described.

Display device 302 has a screen 304 for displaying the provided digital representation of a coating layer and the generated color data of the colored coating layer received from the processor 312, in particular via a graphical user interface (GUI), to the user. For this purpose, display device 302 is operatively coupled to processor 312 via a communication interface. In this example, the display device 302 is connected to processor 312 via communication interfaces 322, 324, sensing circuit 308 and input/output (I/O) controller 310. In another example, display device 302 is coupled directly to the processor 312 via a communication interface. In this example, display device 302 is integrated with processor 312 and memory 314 to form a desktop computer (all in one machine), a laptop, handheld or tablet or the like. In another example, display device 302 may be a separate component (peripheral device, not shown). By way of example, the display device 302 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The system further includes an interaction element 306 for detecting a user input which is operatively coupled to the processor 312 via a communication interface. In this example, the interaction element 306 is a touch screen which is operatively coupled to the processor 312 via sensing device 308 and input/output (I/O) controller 310 such that the processor can detect a user input via the interaction element 306. The touch screen 306 is a transparent panel that is positioned in front of the screen 304 of the display device 302. In this example, the touch screen 306 is integrated with the display device 302. In another example, the touch screen 306 is a separate component. The touch screen 306 is configured to receive input from a user's touch and to send this information to the processor 312. For this purpose, the touch screen 306 recognizes touches and the position and magnitude of touches on its surface. In one example, the touch screen 306 is capable of tracking multiple objects, which rest on, tap on, or move across the touch sensitive surface of the touch screen at the same time. The multiple objects may for example correspond to fingers and palms. Because the touch screen is capable of tracking multiple objects, a user may perform several touch-initiated tasks at the same time. For example, the user may move a scroll bar with one finger while selecting an item from a menu with another finger. Furthermore, a first object may be dragged with one finger while a second object may be dragged with another finger. Moreover, gesturing may be performed with more than one finger. The touch screen 306 generally includes a sensing device configured to detect an object in close proximity thereto and/or the pressure exerted thereon, for example by using sensing points positioned throughout the touch screen 306. In the simplest case, a signal is produced each time an object is positioned over a sensing point, for example by using capacitance. When an object is placed over multiple sensing points or when the object is moved between or over multiple sensing point, multiple signals are generated. In this example, the touch screen 306 includes a sensing circuit 308 connected via communication interface 322 to the touch screen 306 that acquires the data from the sensing device. The sensing circuit 308 is connected via communication interface 324 to input/output (I/O) controller 310 that is operatively coupled to the processor 312. In this example, the (I/O) controller 310 is a separate component. In another example, the (I/O) controller 310 is integrated with the processor 312. The I/O controller 310 is generally configured to control interactions with one or more I/O devices, such as the touch screen 306. The I/O controller 310 generally operates by exchanging data between the processor 312 and the I/O devices that desire to communicate with the processor. The data acquired from the sensing circuit 308 are thus supplied via (I/O) controller 310 to the processor 312. In another example, the processor may include this functionality. In one example, the sensing circuit 308 is configured to send raw data to the processor 312 so that the processor 312 processes the raw data. For example, the processor 312 receives data from the sensing circuit 308 and then determines how the data is to be used within the computer system 300. The data may include the coordinates of each sensing point as well as the pressure exerted on each sensing point. In another example, the sensing circuit 308 is configured to process the raw data itself by reading the pulses from the sensing points and turning them into data that the processor 312 can understand. The sensing circuit 308 may perform filtering and/or conversion processes. Filtering processes are typically implemented to reduce a busy data stream so that the processor 312 is not overloaded with redundant or non-essential data. The conversion processes may be implemented to adjust the raw data before sending or reporting them to the processor 312. The conversions may include determining the center point for each touch region (e.g., centroid). The sensing circuit 308 may include a storage element for storing a touch screen program, which is a capable of controlling different aspects of the touch screen 306. For example, the touch screen program may contain what type of value to output based on the sensing points selected (e.g., coordinates). In fact, the sensing circuit 308 in conjunction with the touch screen program may follow a predetermined communication protocol. As is generally well known, communication protocols are a set of rules and procedures for exchanging data between two devices. Communication protocols typically transmit information in data blocks or packets that contain the data to be transmitted, the data required to direct the packet to its destination, and the data that corrects errors that occur along the way. By way of example, the sensing circuit may place the data in a HID format (Human Interface Device). The sensing circuit 308 generally includes one or more microcontrollers, each of which monitors one or more sensing points. The microcontrollers may for example correspond to an application specific integrated circuit (ASIC), which works with firmware to monitor the signals from the sensing device and to process the monitored signals and to report this information to the processor 312. Suitable touch screens are commercially available and are commonly included in mobile devices, such as smartphones or tablets.

The touch screen 306 reports the touches to the processor 312 and the processor 312 converts the touches into a modified digital representation of the colored coating layer according to its programming.

In another example, the interaction element 306 is a mouse which is operatively coupled to the processor 312 via a communication interface. The mouse may be connected to the processor via input/output (I/O) controller 310 as previously described in connection with the touch screen. The (I/O) controller 310 reports the clicks to the processor 312 and the processor 312 converts the clicks into a modified digital representation of the colored coating layer according to its programming.

Afterwards, the processor 312 generates color data of the colored coating layer based on the modified digital representation of the colored coating layer. In this example, the processor 312 generates color data by retrieving said color data stored in database 320 via communication interface 328 based on the modified digital representation. In another example, the processor 312 generates color data by using a data driven model stored in database 320 and being parametrized on color data of historical coating layers and historical formulations of colored coating materials used to prepare the historical coating layers to calculate color data based on said model and the generated modified digital representation.

The color based on the generated color data is displayed by the display device after processor 312 has performed a rendering process, such as image based lightning as previously described, using the generated color data and virtual object data stored in database 318 and retrieved by processor 312 via communication interface 332 prior to rendering.

Figure 3B:
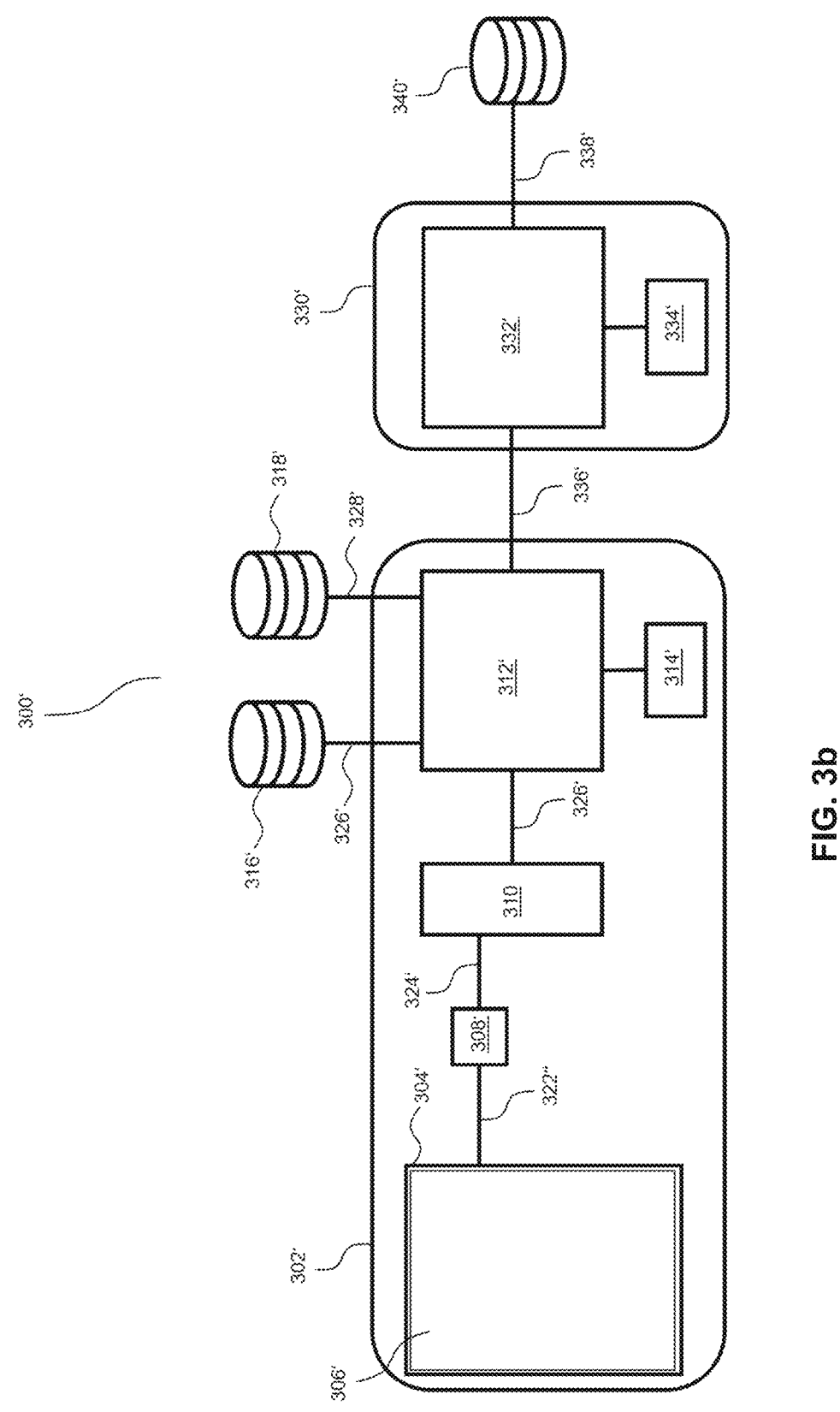
FIG. 3b illustrates a system in accordance with a second embodiment of the invention

FIG. 3b shows an alternative embodiment of a system 300' for designing the color of a colored coating layer being produced from a colored coating material. In this example, system 300' comprises a display device 302' which is coupled via a communication interface 326', 328', to databases 316', 318' and a computing device 332' which is connected via communication interface 336' to display device 302' and via communication interface 338' to database 340'. In another example, computing device 332' may have access to database 318' via a further communication interface (not shown).

Computing device 330' may be a single computing device or located in a server environment. In the latter case, display device 302' may serve as a client device and may access the server (i.e. computing device 330') via a network (i.e. communication interface 336'), such as the Internet. Preferably, the server may be an HTTP server and is accessed via conventional Internet web-based technology. The internet-based system is in particular useful, if the service of designing the color of a colored coating layer being produced from a colored coating material is provided to customers or in a larger company setup.

As shown in FIG. 3b, computer system 300' includes a processor 312' configured to execute instructions, for example retrieved from memory 314', and to carry out operations associated with the computer system 300', namely receive via a communication interface the digital representation of a colored coating layer;

detect a user input via the interaction element; and optionally convert the detected user input into a modified digital representation of the colored coating layer.

In this example, the digital representation of the colored coating layer is received via communication interface 326' from database 316'. In another example, it is retrieved from memory 314' by processor 312'.

Display device 302' has a screen 304' for displaying the provided digital representation of a coating layer and the generated color data of the colored coating layer received from processor 312', in particular via a graphical user interface (GUI), to the user. For this purpose, display device 302' is operatively coupled to the processor 312' via a communication interface. In this example, display device 302' is connected to processor 312' via communication interfaces 322', 324', sensing circuit 308' and input/output (I/O) controller 310'. In another example, display device 302' is coupled directly to processor 312' via a communication interface. In this example, display device 302' is integrated with processor 312' and memory 314' to form a desktop computer (all in one machine), a laptop, handheld or tablet or the like. In another example, display device 302' may be a separate component (peripheral device, not shown). Display device 302' is used to display color associated with the digital representation of the colored coating layer and the color associated with the generated color data as described in FIG. 3a. In this example, display device 302' further contains interaction element 306' as described in FIG. 3*a* and processor 312' of display device 302' is used to detect the user input via interaction element 306' as described in FIG. 3*a*.

In one example, processor 312' of display device 302' converts the detected user input into a modified digital representation of the colored coating layer. In another example, processor 332' is used for this purpose as outlined below. Computer system 300' further includes a processor 332' residing within computing device 330' configured to execute instructions, for example retrieved from memory 334', and to carry out operations associated with the computer system 300', namely optionally convert the detected user input into a modified digital representation of the colored coating layer; and generate color data of the coating layer based on the modified digital representation of the colored coating layer.

Use of two different computer processors performing different steps of the inventive method allows to shift the step requiring high computing power to a separate computing device, thus allowing to use display devices having limited computing power without negatively influencing the computing time necessary for generating of color data which may include the use of high computing power to perform the calculations within acceptable time frames. This embodiment of the system is thus especially preferred if generation of the color data is performed by calculating color data using the modified digital representation and a data driven model as previously described. With respect to suitable computer processors 314' and 334', reference is made to FIG. 3*a*. Processor 332' of computing device 330' retrieves a data driven model stored in database 340' and being parametrized on color data of historical coating layers and historical formulations of colored coating materials used to prepare the historical coating layers and calculates color data using the retrieved data driven model and the modified digital representation (either generated by processor 332' or provided to processor 332' via communication interface 336' from processor 312').

In one example, the color based on the generated color data is displayed by display device 302' after processor 312' has performed a rendering process, such as image based lightning as previously described, using the generated color data and virtual object data stored in database 318' and retrieved by processor 312' via communication interface 328' prior to rendering. In another example, the color based on the generated color data is displayed by display device 302' after processor 332' has performed a rendering process, such as image based lightning as previously described, using the generated color data and virtual object data stored in database 318' and retrieved via a communication interface (not shown) by processor 336' and has provided the rendering result to processor 312' via communication interface 336'. This may be preferred if the computing power of processor 312' of display device 302' is not sufficient to perform the rendering within an acceptable time frame.

Figure 4:
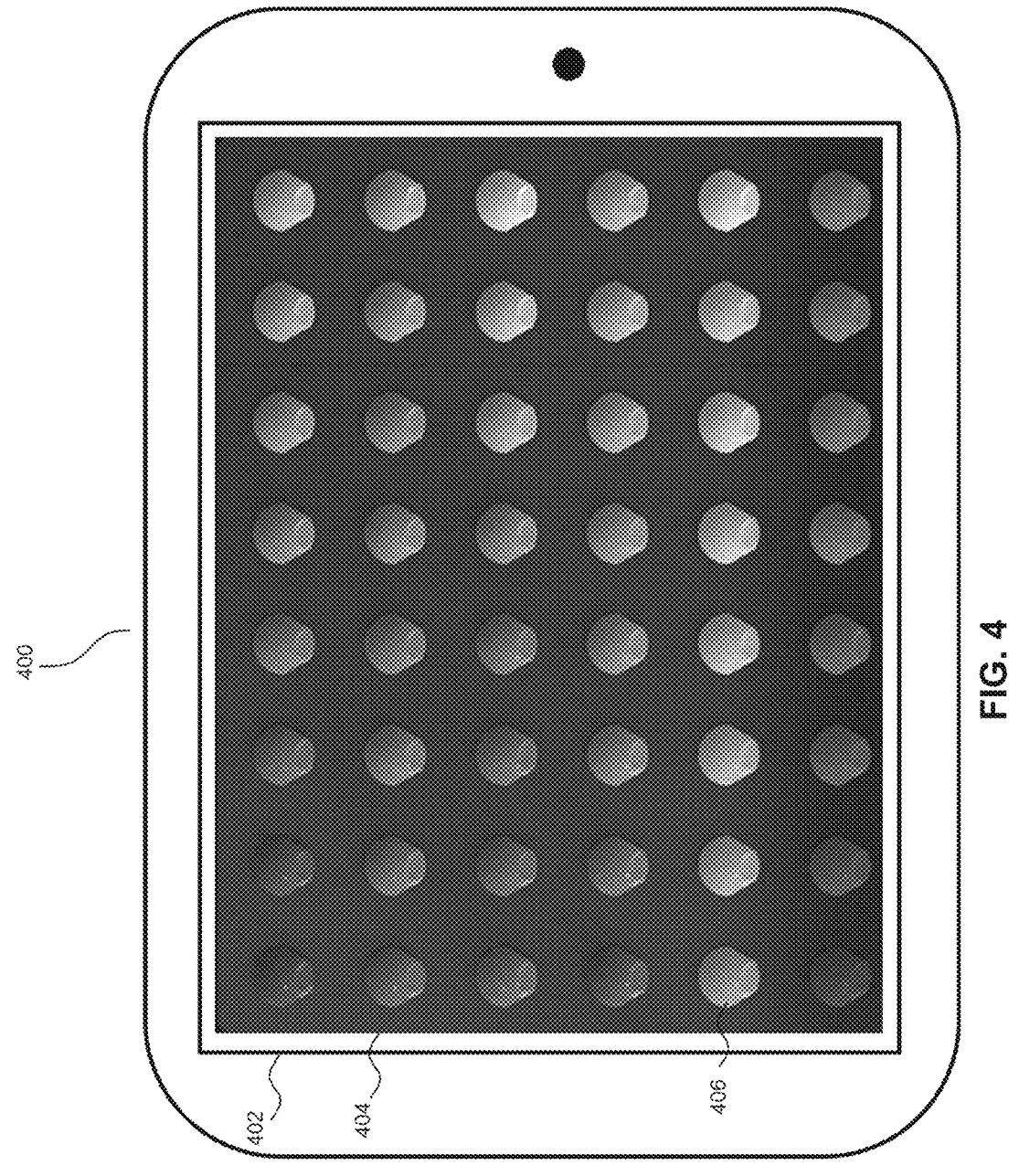
FIG. 4 is a planar view of a display device having a graphical user interface showing a pre-existing color library in which the colors are displayed on virtual 3D objects in the form of dome reliefs

FIG. 4 illustrates a system 400 comprising/consisting of a display device having a screen 402 on which a graphical user interface 404 showing a pre-existing color library is displayed to the user. Suitable system are described in connection with FIGS. 3*a* and 3*b*. The graphical user interface 404 may be, for example, displayed in block 102 of FIG. 1 or block 202 of FIG. 2. In this example, the graphical user interface 404 is displayed on a portable display device 400, such as a tablet. In another example, the graphical user interface 404 is displayed on a stationary display device, such as a stationary computer monitor. The graphical user interface 404 illustrates a pre-existing color library in which colors of colored coating layers are shown on 3D virtual objects having a dome shape 406. In this example, the pre-existing color library contains 195 colors of which 48 colors are shown on the screen of the display device. Further colors may be viewed by scrolling through the pre-existing color library via touchscreen gestures. The pre-existing color library is displayed by rendering object data of virtual dome shape objects and color data associated with the pre-defined library using predefined illumination conditions (image-based lightning) with a processor being present inside the display device 400 and displaying the rendering result on the screen 402. In this example, the color data associated with the predefined library is stored in a database and is provided via a communication interface, preferably a wireless communication interface, to the processor of the display device prior to rendering. In another example, the color data associated with the pre-defined color library is stored on the memory present inside the display device 400. In this example, the color data is obtained by generating an optimized BTF from an initial BTF as described previously. Briefly, this method includes:

determining an initial BTF for the object using a camera-based measurement device, capturing spectral reflectance data for the object for a pre-given number, i.e. a limited number of different measurement geometries using a spectrophotometer, and adapting the initial BTF to the captured spectral reflectance data to obtain an optimized BTF by segmenting the initial BTF of formula (1)

$$f(x, \bar{\imath}, \bar{o}) = \chi(\bar{\imath}, \bar{o})\left(\frac{a}{\pi} + \Sigma_{k=1}^{3} f_{S_k, a_k, F_{0,k}}^{CT}(\bar{\imath}, \bar{o})\right) + \Xi(x, \bar{\imath}, \bar{o}) \qquad (1)$$

in which x: surface coordinates of the sample/object $\bar{\imath}$, $\bar{o}$: illumination and observation/viewing directions at the basecoat of the sample $x(\bar{\imath}, \bar{o})$: color table depending on illumination and observation direction $\alpha$: Albedo or diffuse reflectivity $$f_{S_k, a_k, F_{0,k}}^{CT}(\bar{\imath}, \bar{o})$$

the k-th Cook-Torrance lobe; the Cook-Torrance lobe is a commonly used BRDF that describes the glossiness of a microfacet surface $S_k$: weight for the k-th Cook-Torrance lobe $\alpha_k$: parameter for the Beckmann distribution of the k-th Cook-Torrance lobe $F_{0,k}$: Fresnel reflectivity for the k-th Cook-Torrance lobe $\Xi(x, \bar{\imath}, \bar{o})$: table of spatial texture images depending on illumination and observation direction into a term $$\chi(\bar{\imath}, \bar{o})\left(\frac{a}{\pi} + \Sigma_{k=1}^{3} f_{S_k, a_k, F_{0,k}}^{CT}(\bar{\imath}, \bar{o})\right) \qquad (F1)$$

and a term $\Xi(x, \bar{\imath}, \bar{o})$ (F2), further dividing the first term (F1) into a first sub-term corresponding to a color table depending on illumination and observation direction $\chi(\bar{\imath}, \bar{o})$ and a second sub-term corresponding to an intensity function $$\left(\frac{a}{\pi} + \Sigma_{k=1}^{3} f_{S_k,a_k,F_{0,k}}^{CT}(\tau, \bar{o})\right)$$

and minimizing a color difference between the captured spectral reflectance data and the initial BTF by optimizing in a first optimization step the parameters of the first sub-term while the parameters of the second sub-term are kept constant, and by optimizing in a second optimization step the parameters of the second sub-term while the parameters of the first sub-term are kept constant.

In another example, the color data is obtained by measuring the color of the colored coating layer with a spectrophotometer.

Figure 5:
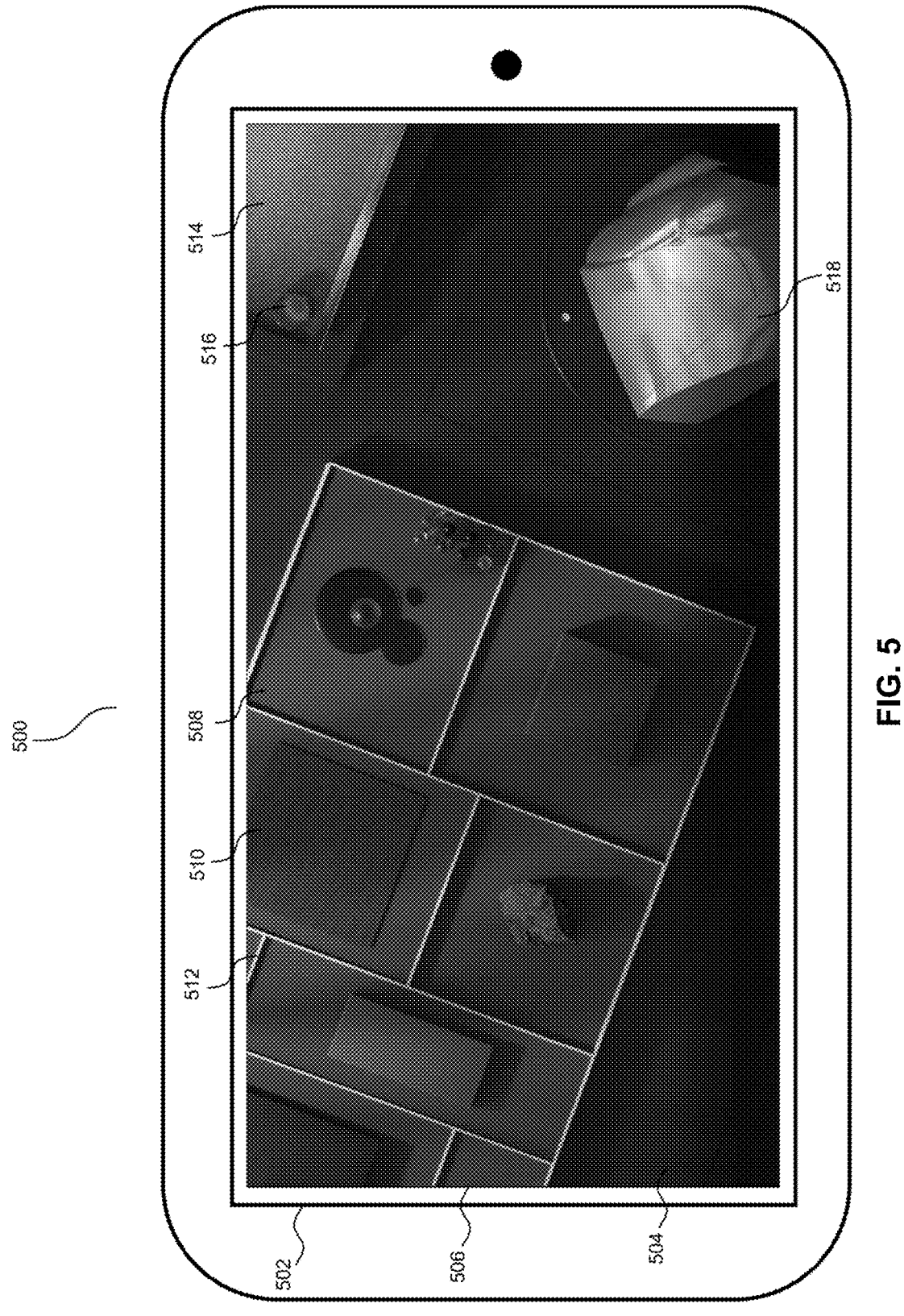
FIG. 5 is a planar view of a display device having a graphical user interface showing adjustment tools and a virtual 3D object in the form of part of an automotive body being colored with the color selected from the pre-existing color library

FIG. 5 illustrates a system 500 comprising/consisting of a display device having a screen 502 on which a graphical user interface 504 for modifying the digital representation of the colored coating layer is displayed to the user. This user interface 504 may be displayed after the user has selected a color from the pre-existing color library displayed in FIG. 4. In this example, the user interface 504 comprises two adjustment tools 506, 514. Adjustment tool 506 is generated from the provided digital representation and is a box with visually distinct compartments 508.1, 508.n separated by lines 512.1, 512.n. These lines 512.1, 512.n correspond to regulators which allow to adjust the size of each compartment relative to the other compartments being present in the box. Each compartment 508.1, 508.n is indicative of a type of ingredient 510.1, 510.n being present in the coating material associated with the colored coating layer, such as pigments (color pigments, effect pigments), binders etc. The type of the ingredients is displayed in the compartments using graphical representations, such as metal pieces, boxes etc., being indicative of the ingredient type (pigment, binder, etc) and is obtained from the digital representation of the colored coating layer selected by the user and provided to the processor. The size of each compartment 508.1, 508.n is indicative of the amount of the respective ingredient and can be adjusted by the user by touching the touch screen, for example with a finger, and moving at least one lines. Adjustment tool 514 can be used to change the color of the effect pigments being represented by compartment 510 in adjustment tool 506 by moving regulator 516. The color associated with the provided digital representation of the colored coating layer is displayed on part of an automobile body 518. The colored automobile body is obtained by rendering the color data associated with the provided digital representation of the colored coating layer, object data of the virtual automotive body and predefined illumination conditions, in particular a high dynamic range (HDR) environment map (i.e. the rendering is performed using image-based lightning), and displaying the rendering result.

Figure 6:
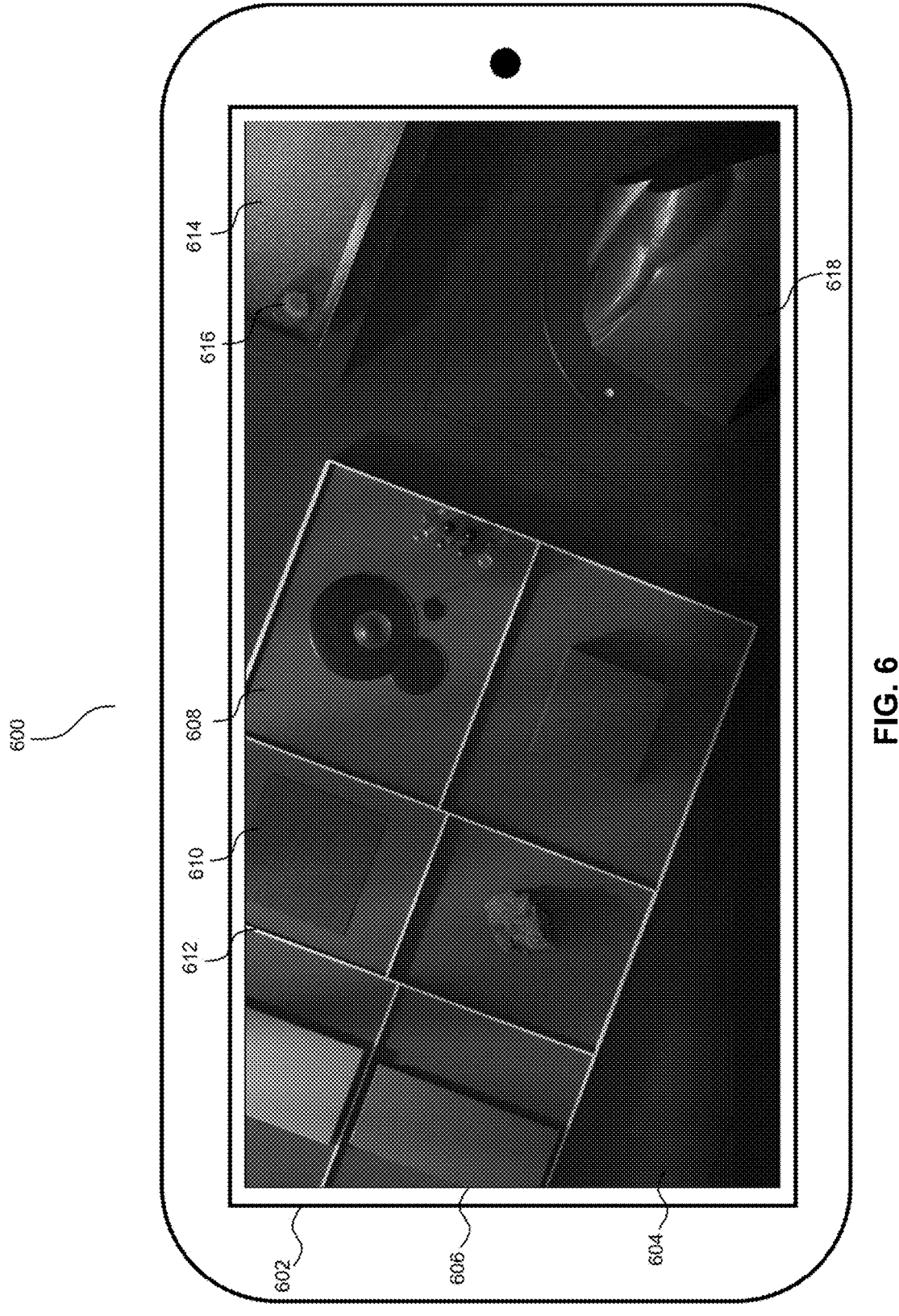
FIG. 6 is a planar view of a display device having a graphical user interface showing the adjustment of regulators of the displayed adjustment tools and a virtual 3D object in the form of part of an automotive body being colored with the color resulting from the adjustment of the regulators

FIG. 6 illustrates a system 600 comprising/consisting of a display device having a screen 602 and a graphical user interface 604 displaying a modified coating material as well as the color associated with the modified coating material. This user interface 604 may be displayed after the user has modified the formulation of the coating material via adjustment tool 506 and/or 514 displayed in FIG. 5. In this example, the user interface 604 comprises two adjustment tools 606, 614. In this example, the color of the colored coating layer displayed in 518 of FIG. 5 has been modified by the user by moving lines 612.1, 612.n of adjustment tool 606 to adjust the amount of the ingredients of the coating material used to prepare the colored coating layer such that the desired color is obtained. In another example, the color of the effect pigment 610 being present in the coating material used to prepare the colored coating layer is modified by moving regulator 616 of adjustment tool 614 to the desired color. In yet another example, the amount of ingredients as well as the color/type of ingredients is modified by using both adjustment tools 606, 614. In this example, screen 602 of the display device comprises a touch screen and the modification is performed by the user via touch screen gestures. In another example, the modification is performed by the user using a mouse via movement of the mouse and/or mouse clicks. The modifications of the coating material made by the user by moving regulators 610.1, 610.n, 614 of adjustment tool(s) 606, 614 via touch screen gestures or the computer mouse are detected with a computer processor as described in connection with FIG. 3. The detected modifications are then used by the processor to convert these detected modifications into a modified digital representation of the colored coating material. In this example, the modified digital representation comprises the modified formulation of the colored coating material reflecting the modifications made by the user via adjustment tool(s) 606, 614 as previously described. In this example, the user input is converted into a modified digital representation by the processor of display device. In another example, the processor of display device forwards the detected user input via a communication interface to a processor located outside of display device in a further computing unit and the second processor of the further computing unit converts the detected user input into a modified digital representation. After the user input has been converted into a modified digital representation, color data associated with the modified digital representation is generated. In this example, color data is calculated using a data driven model parametrized on color data of historical coating layers and historical formulations of colored coating materials used to prepare the historical coating layers and the generated modified digital representation of the colored coating layer with a second processor not being present inside display device. For this purpose, the processor of display device provides the generated modified digital representation via a communication interface to the second processor, the second processor calculates the color data using the data driven model and the provided modified digital representation and provides the calculated color data via the communication interface to the processor of display device for display of the color data. The data driven model is a black box model, such as disclosed in US20020184167A1 and US20190078936A1, and is provided to the second computer processor via a computer readable memory, such as a database. Use of a second processor allows to increase the computing power compared to the computing power available via the processor of display device, thus resulting in reduced computing time and therefore allowing to perform the modification of the color interactively. In another example, the color data is calculated using the processor of display device, the data driven model provided to the processor and the generated modified digital representation. This is preferred if the computing power of the processor of display device is sufficiently high to calculate the color data within short time spans, i.e. within up to a couple of seconds, preferably within a second, to allow interactive modification of the color. In yet another example, the color data is generated by retrieving the color data associated with the modified digital representation from a database or a lookup table connected to the processor of display device 600 via a communication interface. This allows to drastically reduce the time necessary to generate the color data but requires providing pre-calculated color data for any formulation of the coating material the user can generate by using adjustment tools 606, 614 displayed on GUI 604. The generated color data is then displayed on screen 602 of display device. In this example, the generated color data is displayed on GUI 604 on part of an automotive body 618. For this purpose, the generated color data, object data of the virtual automotive body and predefined illumination conditions are rendered by the processor of display device and the rendering result, i.e. colored automotive body 618 having the color associated with the modified coating material displayed via adjustment tools 606 and 614 is displayed on GUI 604 of screen 602 of display device.

The invention claimed is:

1. A method for designing the appearance of an object being coated with at least one colored coating layer, said method comprising the steps of:
   (i) providing to a computer processor via a communication interface a digital representation of a colored coating layer for display on a screen of a display device;
   (ii) detecting a user input with the computer processor via an interaction element by:
      displaying at least part of one or more ingredients being present in a coating material used to prepare the colored coating layer on the screen of the display device by displaying at least one adjustment tool comprising a plurality of regulators, each regulator corresponding to a type and/or amount of an ingredient being present in the coating material, wherein the at least one adjustment tool is generated from the provided digital representation of the coating layer;
      manipulating at least one displayed ingredient via the interaction element; and
      detecting said manipulation;
   (iii) converting with the computer processor the detected user input into a modified digital representation of the colored coating layer;
   (iv) optionally repeating steps (i) to (iii);
   (v) generating, with the computer processor, color data of the coating layer(s) based on the modified digital representation(s) of the colored coating layer(s);
   (vi) displaying on the screen of the display device the generated color data received from the processor; and
   (vii) optionally repeating steps (i) to (vi) or steps (ii) to (vi) or steps (v) and (vi).

2. The method according to claim 1, wherein the digital representation of the colored coating layer comprises data on the formulation of a coating material used to prepare the colored coating layer and optionally color data of the colored coating layer.

3. The method according to claim 1, wherein providing the digital representation of the colored coating layer comprises providing coating layer identification data, obtaining the digital representation of the coating layer based on the provided coating layer identification data, and providing the obtained digital representation.

4. The method according to claim 1, wherein providing the digital representation of the colored coating layer comprises displaying a pre-existing color library on the screen of the display device, selecting a color from the displayed pre-existing library, obtaining the digital representation of the colored coating layer based on the selected color, and providing the obtained digital representation of the colored coating layer.

5. The method according to claim 1, wherein the step of manipulating at least one displayed ingredient via the interaction element comprises adjusting the type and/or amount of at least one displayed ingredient via the interaction element.

6. The method according to claim 1, wherein converting the detected user input into a modified digital representation of the colored coating layer includes converting the detected user input into modified formulation data of the colored coating material used to prepare the colored coating layer.

7. The method according to claim 1, wherein the step of generating color data based on the modified digital representation(s) of the colored coating layer(s) includes obtaining color data based on the modified digital representation(s).

8. The method according to claim 7, wherein obtaining color data based on the modified digital representation(s) includes obtaining color data based on the modified formulation data of the colored coating material(s).

9. The method according to claim 1, wherein the step of generating color data based on the modified digital representation(s) of the colored coating layer(s) includes using a data driven model parametrized on color data of historical coating layers and historical formulations of colored coating materials used to prepare the historical coating layers to calculate color data from the modified digital representation(s) of the colored coating layer(s).

10. The method according to claim 1, wherein the step of displaying the generated color data received from the processor on the screen of the display device includes providing object data of a virtual object, optionally providing further color data of at least one further coating layer, and rendering the received color data, the provided object data and optionally the provided further color data using predefined illumination conditions.

11. The method according to claim 1, further comprising the steps of
   (viii) determining with the computer processor if the modified digital representation of the colored coating layer is within at least one predefined tolerance;
   (ix) optionally in accordance with the determination that the modified digital representation is within at least one predefined tolerance: providing via the communication interface the modified digital representation to a coating material manufacturing site and optionally manufacturing the coating material based on the provided modified digital representation;
   (x) optionally in accordance with the determination that the modified digital representation is outside at least one predefined tolerance: displaying at least one recommendation on the screen of the display device; and
   (xi) optionally in accordance with the determination that the modified digital representation is outside at least one predefined tolerance: repeating steps (i) to (vi) or steps (ii) to (vi) or steps (i) to (xi) or steps (ii) to (xi).

12. The method according to claim 1, wherein the step of generating color data based on the modified digital representation(s) of the colored coating layer(s) includes using a data driven model parametrized on color data of historical coating layers and historical formulations of colored coating materials used to prepare the historical coating layers to calculate color data from the modified formulation data of the colored coating material(s).

13. A non-transitory computer-readable storage medium, the computer-readable storage medium including instructions that when executed by a computer, cause the computer to perform the steps according to the method of claim 1.

14. A system for designing the color of a colored coating layer being produced from a colored coating material, said system comprising:

a communication interface for providing a digital representation of a colored coating layer for display on a screen;

a display device comprising a screen;

an interaction element for detecting a user input;

a processor in communication with the communication interface and the display device, the processor programmed to:

receive via the communication interface the digital representation of a colored coating layer;

detect a user input via the interaction element by:

displaying at least part of one or more ingredients being present in a coating material used to prepare the colored coating layer on the screen of the display device by displaying at least one adjustment tool comprising a plurality of regulators, each regulator corresponding to a type and/or amount of an ingredient being present in the coating material, wherein the at least one adjustment tool is generated from the provided digital representation of the coating layer;

manipulating at least one displayed ingredient via the interaction element; and detecting said manipulation;

convert the detected user input into a modified digital representation of the colored coating layer; and generate color data of the coating layer based on the modified digital representation of the colored coating layer, wherein the display device receives the provided digital representation and the generated color data of the colored coating layer from the processor and displays the digital representation and the color of the coating layer.

15. A method of using the system according to claim 14, the method comprising using the system for designing the color of at least one colored coating layer being present on at least part of the surface of an object.

* * * * *